(12) United States Patent
Kim et al.

(10) Patent No.: US 11,467,697 B2
(45) Date of Patent: Oct. 11, 2022

(54) ELECTRONIC DEVICE AND METHOD FOR DISTINGUISHING BETWEEN DIFFERENT INPUT OPERATIONS

(71) Applicant: Samsung Electronics Co., Ltd., Gyeonggi-do (KR)

(72) Inventors: Hongki Kim, Gyeonggi-do (KR); Jonghwan Kim, Gyeonggi-do (KR); Jungsoo Kim, Gyeonggi-do (KR); Chijeong Choi, Gyeonggi-do (KR); Seungnyun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 17/171,218

(22) Filed: Feb. 9, 2021

(65) Prior Publication Data

US 2021/0247861 A1  Aug. 12, 2021

(30) Foreign Application Priority Data

Feb. 10, 2020 (KR) .......................... 10-2020-0015707

(51) Int. Cl.
*G06F 3/044* (2006.01)
*G06F 3/01* (2006.01)
(Continued)

(52) U.S. Cl.
CPC .............. *G06F 3/044* (2013.01); *G06F 3/017* (2013.01); *G06V 40/1306* (2022.01); *G06V 40/1365* (2022.01)

(58) Field of Classification Search
CPC ..... G06F 3/044; G06F 3/017; G06V 40/1306; G06V 40/1365
See application file for complete search history.

(56) References Cited

U.S. PATENT DOCUMENTS 8,787,994 B2 * 7/2014 Park ...................... G06F 1/1643
455/566
9,164,614 B2  10/2015 Irie
(Continued)

FOREIGN PATENT DOCUMENTS

JP     2007-156634 A   6/2007
KR  10-2010-0102473 A   9/2010
(Continued)

OTHER PUBLICATIONS

International Search Report dated Jun. 3, 2021.

*Primary Examiner* — Michael Pervan
(74) *Attorney, Agent, or Firm* — Cha & Reiter, LLC

(57) ABSTRACT

One embodiment provide an electronic device including: a housing including a touch area; a touch IC; a sensor circuit configured to generate a first signal in response to detecting a movement of the electronic device; a sensor hub; and a processor. The touch IC is configured to: when a contact on the touch area is detected, transmit a second signal to the sensor hub; and after transmitting the second signal to the sensor hub, transmit a third signal for identifying an event corresponding to the contact to the sensor hub. The sensor hub is configured to: when the first signal is received within a first interval starting from a time point at which the second signal is received, invalidate the first signal; and when the third signal is received from the touch IC, transmit the third signal or a fourth signal based on the third signal to the processor.

20 Claims, 11 Drawing Sheets

(51) Int. Cl.
*G06V 40/13* (2022.01)
*G06V 40/12* (2022.01)

(56) References Cited

U.S. PATENT DOCUMENTS

| | | | |
|---|---|---|---|
| 10,313,776 | B2 | 6/2019 | Han et al. |
| 10,484,780 | B2 | 11/2019 | Han et al. |
| 10,509,511 | B2 | 12/2019 | Yang et al. |
| 2007/0126711 | A1* | 6/2007 | Oshita ............... G06F 3/04883 345/173 |
| 2010/0216447 | A1* | 8/2010 | Park .................. H04M 1/0235 455/418 |
| 2013/0321339 | A1* | 12/2013 | Irie ..................... G06F 3/0412 345/174 |
| 2014/0240257 | A1* | 8/2014 | Yu ...................... G06F 3/0412 345/173 |
| 2019/0342651 | A1 | 11/2019 | Howell et al. |

FOREIGN PATENT DOCUMENTS

| | | |
|---|---|---|
| KR | 10-2014-0105354 A | 9/2014 |
| KR | 10-2017-0082022 A | 7/2017 |
| KR | 10-2063342 B1 | 1/2020 |

\* cited by examiner

ELECTRONIC DEVICE AND METHOD FOR DISTINGUISHING BETWEEN DIFFERENT INPUT OPERATIONS

CROSS-REFERENCE TO RELATED APPLICATION(S)

This application is based on and claims priority under 35 U.S.C. 119 to Korean Patent Application No. 10-2020-0015707, filed on Feb. 10, 2020, in the Korean Intellectual Property Office, the disclosure of which is herein incorporated by reference in its entirety.

BACKGROUND

1) Field

One or more embodiments disclosed herein generally relate to technology for distinguishing between different input operations.

2) Description of Related Art

Electronic devices may execute various functions related to phone calls, audios, the Internet, amusement, Bluetooth communication, and moving/still image capture. In order to execute such various functions, the electronic device may receive user inputs (for example, touches on designated areas) through a touch panel. For example, the electronic device may receive relatively simple user inputs (for example, touches or taps) in order to execute such various functions.

The above information is presented as background information only to assist with an understanding of the disclosure. No determination has been made, and no assertion is made, as to whether any of the above might be applicable as prior art with regard to the disclosure.

SUMMARY

An electronic device may execute various functions according to a user input. For example, if the electronic device receives a user input through a designated area of a touch panel, the electronic device may execute a function corresponding to the received user input.

However, if the electronic device receives, through the touch panel, relatively simple user inputs (for example, touches or taps), it may be difficult to distinguish between the simple user inputs (for example, touches or taps). For example, if the electronic device receives a user input (for example, a touch) through the touch panel, the electronic device may execute a function corresponding to the received first user input and also erroneously together with a function corresponding to a second user input (for example, a tap) that is not intended by the user. In this case, the electronic device may sense a movement of the electronic device (corresponding to a tap) when a change in the capacitance is sensed from the touch panel (corresponding to a touch), and may erroneously execute both functional operations corresponding to the two user inputs, respectively.

Moreover, if the electronic device is worn on a part of the user's body (for example, an ear) outside the user's field of view, the electronic device may receive a relatively simple user input (for example, a touch or a tap) while no visual information is presented to the user. For example, the electronic device may execute not only a functional operation corresponding to a first user input (for example, a touch), which is intended by the user, but also a functional operation corresponding to the second user input (for example, a tap), which is not intended by the user. Such an erroneous operation of the electronic device may inconvenience the user.

An electronic device according to an embodiment disclosed herein may include: a housing including a touch area; a touch integrated circuit (IC) electrically connected to the touch area; a sensor circuit configured to generate a first signal in response to detecting a movement of the electronic device; a sensor hub electrically connected to the touch IC and the sensor circuit, and configured to receive the first signal from the sensor circuit; and a processor configured to execute different functional operations according to a signal received from the sensor hub. The touch IC may be configured to: when a contact on the touch area is detected, transmit a second signal to the sensor hub; and after transmitting the second signal to the sensor hub, transmit a third signal for identifying an event corresponding to the contact to the sensor hub. The sensor hub may be configured to: when the first signal is received within a first interval starting from a time point at which the second signal is received, invalidate the first signal; and when the third signal is received from the touch IC, transmit the third signal or a fourth signal based on the third signal to the processor.

A method for distinguishing between different input operations of an electronic device based on a first signal and a second signal according to an embodiment disclosed herein may include the operations of: receiving the second signal according to a contact on a touch area of a housing of the electronic device from a touch IC electrically connected to the touch area; receiving the first signal from a sensor circuit according to a movement of the electronic device within a first interval starting from a time point at which the second signal is received; invalidating the first signal received within the first interval; receiving, from the touch IC, a third signal for identifying an event corresponding to the contact on the touch area; and transmitting the third signal or a fourth signal based on the third signal to a processor to identify the event.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which.

In relation to the description of the drawings, identical or corresponding elements may be provided with identical reference numerals.

DETAILED DESCRIPTION

Certain embodiments disclosed herein provide an electronic device and a method for distinguishing between different input operations in order to execute functional operations intended by the user.

Hereinafter, various embodiments will be described with reference to the accompanying drawings. However, the description does not limit the disclosure to a particular embodiment, and it should be understood that the disclosure includes various modifications, equivalents, and/or alternatives of an embodiment.

Figure 1:
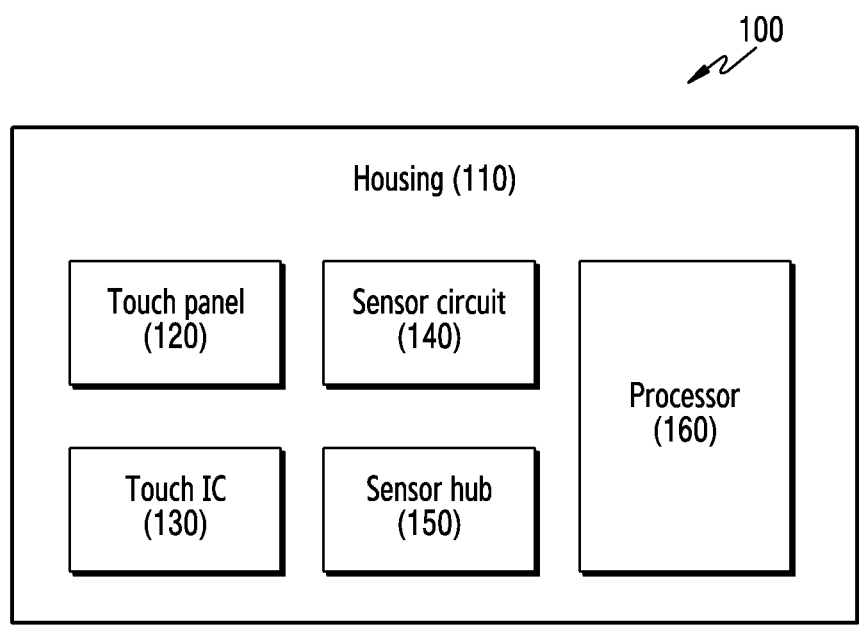
FIG. 1 illustrates elements of an electronic device according to an embodiment.

FIG. 1 illustrates elements of an electronic device according to an embodiment.

Referring to FIG. 1, an electronic device 100 according to an embodiment may distinguish between different input operations (e.g., a touch and a tap) to execute a functional operation (e.g., data reproduction or volume control) intended by a user. For example, the electronic device 100 may distinguish between different input operations (e.g., a touch and a tap) according to a condition (e.g., the touch and the tap have occurred together), so as to prevent a functional operation (e.g., data reproduction or volume control) from being wrongly executed by the input operation (e.g., a touch or a tap) that is not intended by a user.

According to an embodiment, the electronic device 100 may include at least one of a housing 110, a touch panel 120, a touch IC 130, a sensor circuit 140, a sensor hub 150, and a processor 160.

According to an embodiment, at least one of the elements of the electronic device 100 may be disposed in the housing 110. In an embodiment, the housing 110 may be disposed to expose at least a part (e.g., a touch area) of the touch panel 120. For example, the housing 110 may allow the electronic device 100 to receive a user input (e.g., a touch) through the touch panel 120. In an embodiment, at least one of the touch IC 130, the sensor circuit 140, the sensor hub 150, and the processor 160 may be disposed inside (or outside) the housing 110. For example, the housing 110 may allow the electronic device 100 to, when an external force (e.g., a tap by the user) occurs, receive the user input (e.g., a tap) through the sensor circuit 140. In an embodiment, the housing 110 may be worn on (or inserted in) the user body (e.g., an ear). For example, the housing 110 may include an ear tip so as to be worn on (or inserted in) the user's ear.

According to an embodiment, the touch panel 120 may receive user inputs (e.g., a touch). In an embodiment, the touch panel 120 may include a touch area so as to receive the user inputs (e.g., a touch). For example, in the touch panel 120, if contact (e.g., contact by the user) on the touch area occurs, the capacitance of at least a partial area (e.g., the area contacted by the user) of the touch area may be changed. In an embodiment, the touch panel 120 may cause the touch IC 130 to detect the change in capacitance. For example, the touch panel 120 may be electrically connected to the touch IC 130, so as to allow the touch IC to detect the change in capacitance, which is caused by the contact (e.g., contact by the user) on the touch area. In an embodiment, the touch panel 120 may cause the touch IC 130 to generate a signal for controlling an operation of the electronic device, according to the contact (e.g., the contact by the user) on the touch area. In an embodiment, the touch panel 120 may be at least one key button.

According to an embodiment, the touch panel 120 may receive a user input according to the recognition of the user's biometric signal (e.g., fingerprint). According to an embodiment, the touch panel 120 may include a touch area for recognizing the user's biometric signal (e.g., fingerprint). In an embodiment, the touch panel 120 may cause the touch IC 130 to, when the user's biometric signal (e.g., fingerprint) is recognized in the touch area, generate a signal (e.g., data corresponding to the fingerprint) (hereinafter, a biometric recognition signal) for controlling an operation of the electronic device. In an embodiment, the touch panel 120 may cause the biometric recognition signal to be generated through a biometric recognition sensor (e.g., a fingerprint recognition sensor, a PPG sensor, or an ECG sensor).

According to an embodiment, the biometric recognition sensor (e.g., a fingerprint recognition sensor, a PPG sensor, or an ECG sensor) may cause a sensor IC (e.g., a fingerprint recognition IC, a PPG IC, or an ECG IC) to, when the user's biometric signal (e.g., a fingerprint, a heartbeat, a blood pressure, or an electrocardiogram) is recognized in the biometric recognition area, generate a signal (e.g., data corresponding to the biometric signal) for controlling an operation of the electronic device 100 (e.g. health application execution).

According to an embodiment, the touch IC 130 may generate a signal (e.g., data) for controlling the electronic device 100. In an embodiment, when a contact (e.g., contact by the user) on at least a part (e.g., the touch area) of the touch panel 120 occurs, the touch IC 130 may generate multiple signals.

According to an embodiment, the touch IC 130 may generate a second signal for notifying contact on a touch area of the touch panel 120. In an embodiment, the touch IC 130 may generate the second signal indicating whether there is contact, regardless of which event the contact on the touch area of the touch panel 120 corresponds to. In an embodiment, the touch IC 130 may generate the second signal when capacitance change of a designated first change amount or higher is detected in the touch area. For example, the touch IC 130 may generate the second signal different from another signal (e.g., a touch detection signal) indicating the detection of a user input (e.g., a touch) in the touch area. For example, the touch IC 130 may generate the touch detection signal slower than the signal (e.g., a signal caused by a tap) that is generated through the sensor circuit 140 according to a user input (e.g., a tap). Therefore, the touch IC may generate the second signal, which is different from the touch detection signal, and the second signal may be generated earlier than the touch detection signal. In an embodiment, the touch IC 130 may transmit the second signal to the sensor hub 150. For example, the touch IC 130 may transmit the second signal earlier than the touch detection signal to the sensor hub 150.

According to an embodiment, the second signal may be a signal related to whether there is a user contact on a touch area of the touch panel 120.

According to an embodiment, the second signal may be a signal generated when capacitance on a touch area of the touch panel 120 is increased. For example, the second signal may be a signal generated when the capacitance of the touch panel 120 is increased by electricity flowing in the user's hand due to the hand being in contact with the touch panel 120.

According to an embodiment, the second signal may be a fast touch signal that is generated earlier than another signal (e.g., the touch detection signal) indicating the detection of a user input (e.g., a touch) in the touch area.

According to an embodiment, the second signal may be a signal generated according to a user contact on a biometric recognition area of a biometric recognition sensor (e.g., a fingerprint recognition sensor, a PPG sensor, or an ECG sensor).

According to an embodiment, the touch IC 130 may generate a third signal indicating the detection of the release of a user input (e.g., a touch) on a touch area of the touch panel 120. When a capacitance change of a designated second change amount (e.g., a change amount larger than the designated first change amount) or higher is detected in the touch area, the touch IC 130 may generate the third signal. In an embodiment, when capacitance on the touch area is changed (e.g., increased) by at least the designated second change amount, and then is changed (e.g., decreased) by at least the designated second change amount again, the touch IC 130 may generate the third signal. For example, the touch IC 130 may generate the third signal corresponding to the touch detection signal after the generation of the second signal. In an embodiment, the touch IC 130 may transmit the second signal to the sensor hub 150, and then transmit the third signal to the sensor hub 150. For example, the touch IC 130 may transmit the third signal to the sensor hub 150 to cause the processor 160 to execute a functional operation (e.g., data reproduction) of the electronic device 100.

According to an embodiment, the third signal may be a signal indicating the coordinates at which there occurred a user input (e.g., a touch) on a touch area of the touch panel 120.

According to an embodiment, the third signal may be a signal generated when capacitance on a touch area of the touch panel 120 is decreased. For example, the third signal may be a signal generated when the capacitance of the touch panel 120 is decreased by a user's hand in which electricity does not flow due to the hand being separated from the touch panel 120.

According to an embodiment, the third signal may be a signal including measurement data (e.g., a fingerprint, a heartbeat, a blood pressure, an electrocardiogram, a heart rate variability, or an oxygen saturation) value obtained on a biometric recognition area by a biometric recognition sensor (e.g., a fingerprint recognition sensor, a PPG sensor, or an ECG sensor).

According to an embodiment, the touch IC 130 may generate a signal indicating the detection of a user input (e.g., fingerprint recognition) on a touch area of the touch panel 120. In an embodiment, the touch IC 130 may generate the biometric recognition signal according to the recognition of the user's biometric signal (e.g., a fingerprint), and the biometric recognition signal may replace the touch detection signal and the third signal. As such, the touch IC 130 may transmit the biometric recognition signal to the sensor hub 150 in place of the second signal and the third signal. For example, the touch IC 130 may transmit the biometric recognition signal to the sensor hub 150 to cause the processor 160 to execute a functional operation (e.g., data reproduction) of the electronic device 100.

According to an embodiment, the sensor circuit 140 may generate a first signal indicating the detection of a user input (e.g., a tap) on the electronic device 100. In an embodiment, the sensor circuit 140 may generate the first signal when movement of the electronic device 100 is detected. For example, when there is an external force (e.g., a tap by the user), such that at least some elements (e.g., the housing 110) of the electronic device 100 are impacted, the sensor circuit 140 may detect the movement of the electronic device 100. In an embodiment, the sensor circuit 140 may transmit the first signal to the sensor hub 150. For example, the sensor circuit 140 may transmit the first signal to the sensor hub 150 to cause the processor 160 to execute a functional operation (e.g., volume control) of the electronic device 100. In an embodiment, the sensor circuit 140 may include an acceleration sensor for detecting the external force (e.g., a tap by the user).

According to an embodiment, the sensor hub 150 may receive various signals (e.g., the first signal, the second signal, the third signal, and the touch detection signal) from the touch IC 130 and the sensor circuit 140. In an embodiment, the sensor hub 150 may transmit the various signals to the processor 160. In an embodiment, the sensor hub 150 may distinguish between the various signals to determine various conditions (e.g., a touch and a tap have occurred together), and then transmit the same signals to the processor 160. For example, if the first signal and the second signal are both received, the sensor hub 150 may transmit the first signal to the processor 160 or transmit the third signal to the processor 160. In an embodiment, the sensor hub 150 may transmit a fourth signal (e.g., a biometric recognition signal) based on the third signal to the processor 160.

According to an embodiment, the sensor hub 150 may receive the second signal from the touch IC 130. In an embodiment, the sensor hub 150 may configure a designated first interval from a time point at which the second signal is received. For example, the sensor hub 150 may configure the designated first interval to be 200-400 ms from when the second signal is received.

According to an embodiment, the sensor hub 150 may receive the first signal from the sensor circuit 140. In an embodiment, when the first signal is received from the sensor circuit 140 in the designated first interval, the sensor hub 150 may invalidate the first signal received in the designated first interval. For example, the sensor hub 150 may ignore the first signal received from the sensor circuit 140 in the designated first interval so that the sensor hub does not transmit the first signal to the processor 160. In an embodiment, when the first signal is received from the sensor circuit 140 in an interval outside the designated first interval, the sensor hub 150 may transmit the first signal to the processor 160 so that the processor 160 executes a functional operation (e.g., volume control) according to the corresponding user input (e.g., a tap).

In an embodiment, the sensor hub 150 may configure a designated second interval from a time point at which the first signal is received. For example, the sensor hub 150 may configure the designated second interval to be 200-300 ms from when the first signal is received.

According to an embodiment, the sensor hub 150 may receive the second signal from the sensor circuit 140. In an embodiment, when the second signal is received from the sensor circuit 140 in the designated second interval, the sensor hub 150 may invalidate the first signal which was used in the configuration of the designated second interval. For example, the sensor hub 150 may ignore the first signal received from the sensor circuit 140 that was used in the configuration of the designated second interval so that the sensor hub does not transmit the first signal to the processor 160. In an embodiment, when the second signal is not received from the sensor circuit 140 within the designated second interval, the sensor hub 150 may transmit the first signal which was used in the configuration of the designated second interval to the processor 160 so that the processor 160 executes a functional operation (e.g., volume control) according to the user input (e.g., a tap).

According to an embodiment, the sensor hub 150 may receive the touch detection signal and/or the third signal from the touch IC 130. In an embodiment, the sensor hub 150 may further receive the touch detection signal from the touch IC 130 after the second signal is received from the touch IC 130. For example, if the touch detection signal is received, the sensor hub 150 may receive the third signal for identifying an event (e.g., a touch) from the touch IC 130 corresponding to the touch detection signal. For example, the sensor hub 150 may transmit the third signal to the processor 160 so as to cause the processor 160 to execute a functional operation (e.g., data reproduction) according to the user input (e.g., a touch).

According to an embodiment, when the sensor hub 150 invalidates the first signal (the first signal that was used in the configuration of the designated second interval) received from the sensor circuit 140 within the designated first interval, the sensor hub may block the reception of the first signal from the sensor circuit 140. For example, when the reception of the first signal from the sensor circuit 140 is blocked, the sensor hub 150 may not receive the first signal from the sensor circuit 140 any longer. For example, the sensor hub 150 may block the reception of the first signal from the sensor circuit 140, so as to prevent interference (e.g., the first signal and the third signal are transmitted together to the processor 160) caused by the first signal when the sensor hub 150 is waiting for the reception of the touch detection signal and the third signal.

According to an embodiment, the sensor hub 150 may block the reception of the first signal until the third signal is received from the touch IC 130 after the first signal is invalidated. For example, the sensor hub 150 may not receive the first signal generated by the user input (e.g., a tap) until the third signal is received from the touch IC 130. In an embodiment, when the third signal is received from the touch IC 130 after the first signal is invalidated, the sensor hub 150 may reset so as to allow the reception of the first signal from the sensor circuit 140.

According to an embodiment, the sensor hub 150 may block the reception of the first signal from the sensor circuit 140 during a designated third interval after the first signal is invalidated. For example, the sensor hub 150 may not receive the first signal generated by a user input (e.g., a tap) until the designated third interval has passed. According to an embodiment, when the designated third interval has passed, the sensor hub 150 may reset so as to allow the reception of the first signal from the sensor circuit 140.

According to an embodiment, the sensor hub 150 may receive a combination of the first signal and the third signal. In an embodiment, the sensor hub 150 may receive the third signal from the touch IC 130 within a designated fourth interval after the first signal is invalidated, and may receive the first signal from the sensor circuit 140 within the designated fourth interval. In an embodiment, the sensor hub 150 may configure the designated fourth interval as a time interval for receiving a combination of the first signal and the third signal. In an embodiment, the sensor hub 150 may transmit a combination of the first signal and the third signal to the processor 160 so as to cause the processor to execute a functional operation (e.g., power on, power off, volume control, data reproduction, data-pausing, and data reproduction speed control) according to a user input (e.g., a touch or a tap). For example, the sensor hub 150 may allow the processor 160 to execute at least one of power on, power off, volume control, data reproduction, data-pausing, and data reproduction speed control according to the number of occurrences of a user input (e.g., a touch) and another user input (e.g., a tap) within the designated fourth interval.

According to an embodiment, the processor 160 may execute different functional operations (e.g., data reproduction and volume control) according to user inputs (e.g., a touch or a tap). In an embodiment, when the first signal is received from the sensor hub 150, the processor 160 may execute at least one functional operation (e.g., volume control). In an embodiment, when the third signal is received from the sensor hub 150, the processor 160 may execute at least one functional operation (e.g., data reproduction).

According to an embodiment, the processor 160 may execute a functional operation (e.g., power on, power off, volume control, data reproduction, data-pausing, and data reproduction speed control) according to a combination of user inputs (e.g., a touch and a tap). In an embodiment, the processor 160 may execute at least one of power on, power off, volume control, data reproduction, data-pausing, and data reproduction speed control according to a combination of the first signal and the third signal received from the sensor hub 150 in the designated fourth interval.

According to an embodiment, with reference to [Table 1], [Table 2], [Table 3], and [Table 4], signals (e.g., first signal, second signal, and third signal) transmitted from the touch IC 130 and the sensor circuit 140 to the sensor hub 150 can be explained. For example, the sensor hub 150 may transmit individual signals (e.g., first signal, second signal, and third signal) to the processor 160 corresponding to the signal reception states shown in [Table 1], [Table 2], [Table 3], and [Table 4].

TABLE 1

| User input operation | Time | | | | | | Signal reception state |
|---|---|---|---|---|---|---|---|
| | 100 ms | 200 ms | 300 ms | 400 ms | 500 ms | 600 ms | |
| Tap | | √ (first interval and third interval) Tap invalidated | | | Tap allowed | | Invalidation |
| Touch | √ Touch occurred | | | Touch released | | | Third signal |

Referring to [Table 1], the sensor hub 150 according to an embodiment may receive the second signal (e.g., the fast touch signal) from the touch IC 130 at a first time point (e.g., 100 ms) after the electronic device 100 is worn on (or inserted in) the user's body (e.g., an ear). In an embodiment, the sensor hub 150 may configure a designated first interval (e.g., 200-400 ms) after the first time point (e.g., 100 ms) at which the second signal is received. For example, the sensor hub 150 may configure a designated first interval (e.g., 200-400 ms) between the first time point (e.g., 100 ms) at which the second signal is received, and a time point at which the third signal is received.

According to an embodiment, the sensor hub 150 may receive the first signal from the sensor circuit 140 at a second time point (e.g., 200 ms). In an embodiment, when the second time point (e.g., 200 ms) at which the first signal is received belongs in the designated first interval (e.g., 200-400 ms), the sensor hub 150 may invalidate the first signal received at the second time point (e.g., 200 ms). In an embodiment, when the sensor hub 150 invalidates the first signal, the sensor hub may block the reception of the first signal from the sensor circuit 140 during a designated third interval (e.g., 300-400 ms).

According to an embodiment, the sensor hub 150 may receive the third signal from the touch IC 130 at a third time point (e.g., 400 ms) after the first signal is invalidated at the second time point (e.g., 200 ms). For example, the sensor hub 150 may allow the reception of the first signal from the sensor circuit 140 at or after the third time point (e.g., 400 ms). In an embodiment, the sensor hub 150 may exclude the invalidated first signal, and transmit the third signal received at the third time point (e.g., 400 ms) to the processor 160.

According to an embodiment, the sensor hub 150 may receive the first signal from the sensor circuit 140 at a second time point (e.g., 200 ms). In an embodiment, when the second time point (e.g., 200 ms) at which the first signal is received belongs in the designated first interval (e.g., 200-400 ms), the sensor hub 150 may invalidate the first signal received at the second time point (e.g., 200 ms). In an embodiment, when the sensor hub 150 invalidates the first signal, the sensor hub may block the reception of the first signal from the sensor circuit 140 during a designated third interval (e.g., 300-400 ms).

According to an embodiment, the sensor hub 150 may receive the third signal from the touch IC 130 at a third time point (e.g., 400 ms) after the first signal is invalidated at the second time point (e.g., 200 ms). For example, the sensor hub 150 may allow the reception of the first signal from the sensor circuit 140 at or after the third time point (e.g., 400 ms). In an embodiment, the sensor hub 150 may exclude the invalidated first signal, and transmit the third signal received at the third time point (e.g., 400 ms) to the processor 160.

According to an embodiment, the sensor hub 150 may receive the first signal from the sensor circuit 140 at a fourth time point (e.g., 500 ms or 600 ms). In an embodiment, the sensor hub 150 may transmit the first signal received at the fourth time point (e.g., 500 ms or 600 ms) to the processor

TABLE 2

| User input operation | Time | | | | | | Signal reception state |
|---|---|---|---|---|---|---|---|
| | 100 ms | 200 ms | 300 ms | 400 ms | 500 ms | 600 ms | |
| Tap | | √ (first interval and third interval) Tap invalidated | | | √ Tap occurred | √ Tap occurred | First signal |
| Touch | √ Touch occurred | | | Touch released | | | Third signal |

Referring to [Table 2], the sensor hub 150 according to an embodiment may receive the second signal from the touch IC 130 at a first time point (e.g., 100 ms) after the electronic device 100 is worn on (or inserted in) the user's body (e.g., an ear). In an embodiment, the sensor hub 150 may configure a designated first interval (e.g., 200-400 ms) after the first time point (e.g., 100 ms) at which the second signal is received. For example, the sensor hub 150 may configure a designated first interval (e.g., 200-400 ms) between the first time point (e.g., 100 ms) at which the second signal is received, and a time point at which the third signal is received.

160. For example, the sensor hub 150 may transmit the first signal to the processor 160 independently from the third signal received at the third time point (e.g., 400 ms). For example, when the reception of the first signal from the sensor circuit 140 is allowed at or after the third time point (e.g., 400 ms) at which the third signal is received, the sensor hub 150 may transmit the first signal received at the fourth time point (e.g., 500 ms or 600 ms) to the processor 160.

TABLE 3

| User input operation | Time | | | | | | Signal reception state |
|---|---|---|---|---|---|---|---|
| | 100 ms | 200 ms | 300 ms | 400 ms | 500 ms | 600 ms | |
| Tap | √ Tap occurred | (second interval) | | (third interval) | | | Invalidation |
| Touch | | | √ Touch occurred | | | Touch released | Third signal |

Referring to [Table 3], the sensor hub 150 according to an embodiment may receive the first signal from the sensor circuit 140 at a first time point (e.g., 100 ms) after the electronic device 100 is worn on (or inserted in) the user's body (e.g., an ear). In an embodiment, the sensor hub 150 may configure a designated second interval (e.g., 200-300 ms) from the first time point (e.g., 100 ms) at which the first signal is received. For example, the sensor hub 150 may configure a designated second interval (e.g., 200-300 ms) between the first time point (e.g., 100 ms) at which the first signal is received, and a time point at which the third signal is received.

According to an embodiment, the sensor hub 150 may receive the second signal from the touch IC 130 at a second time point (e.g., 300 ms). In an embodiment, when the second time point (e.g., 300 ms) at which the second signal is received belongs in the designated second interval (e.g., 200-300 ms), the sensor hub 150 may invalidate the first signal received at the first time point (e.g., 100 ms). In an embodiment, when the sensor hub 150 invalidates the first signal, the sensor hub may block the reception of the first signal from the sensor circuit 140 during a designated third interval (e.g., 400-600 ms).

According to an embodiment, the sensor hub 150 may receive the third signal from the touch IC 130 at a third time point (e.g., 400 ms) after the first signal is invalidated at the second time point (e.g., 300 ms). For example, the sensor hub 150 may allow the reception of the first signal from the sensor circuit 140 at or after the third time point (e.g., 400 ms). In an embodiment, the sensor hub 150 may exclude the invalidated first signal, and transmit the third signal received at the third time point (e.g., 400 ms) to the processor 160.

the second signal received at the third time point (e.g., 500 ms), the sensor hub 150 may exclude invalidated first signals, and transmit the third signal received at a time point after the third time point (e.g., 500 ms) to the processor 160. For example, the sensor hub 150 may transmit the third signal to the processor 160 independently from the first signal received at the first time point (e.g., 100 ms).

Figure 2:
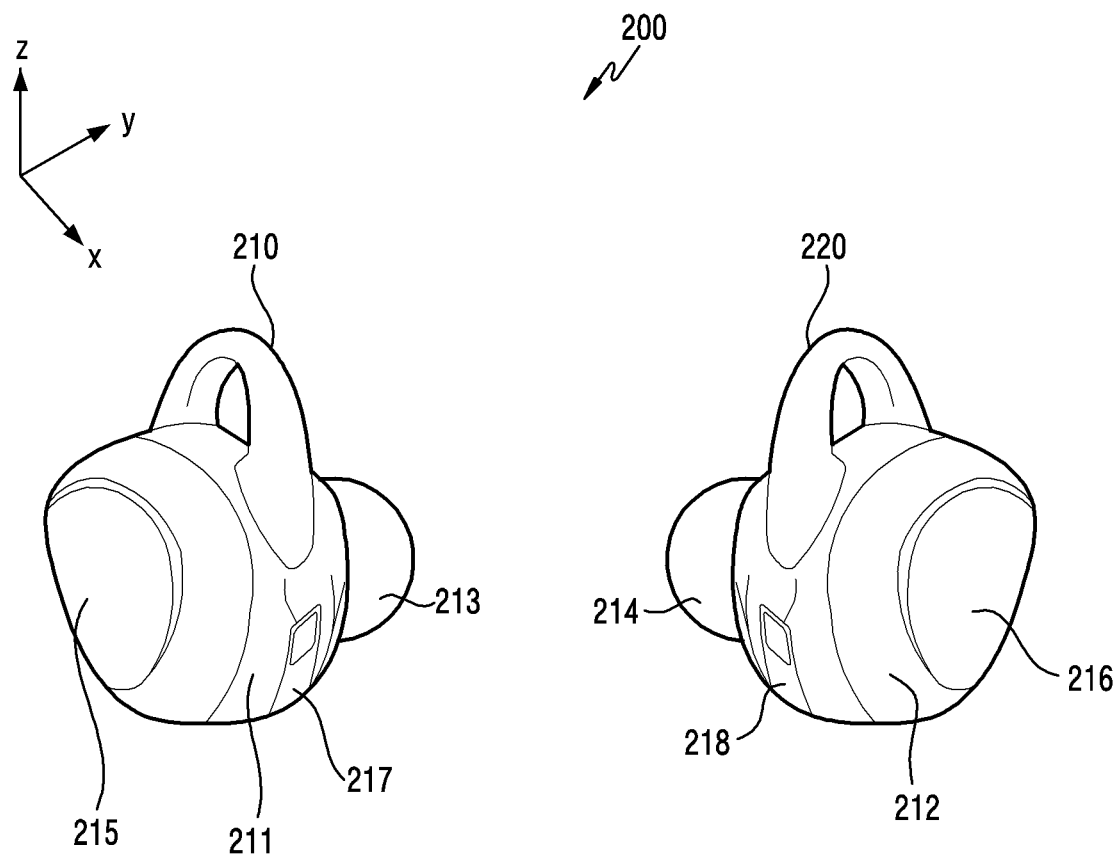
FIG. 2 illustrates the outer appearance of an electronic device according to an embodiment.

FIG. 2 illustrates the outer appearance of an electronic device according to an embodiment.

Referring to FIG. 2, an electronic device 200 according to an embodiment may include a first electronic device 210 and a second electronic device 220, which are of a type (e.g., ear-wearable type) of electronic devices in which the electronic devices can operated while being worn on (or inserted in) the user's body (e.g., an ear). For example, the electronic device 200 may be called an earphone set or earphones including the first electronic device 210 and the second electronic device 220.

According to an embodiment, the first electronic device 210 may include at least one of a body 211, an ear tip 213, a key button 215, and a sensor 217.

According to an embodiment, the ear tip 213, the key button 215, and the sensor 217 may be disposed in the body 211 (e.g., the housing 110 in FIG. 1). In an embodiment, the body 211 may be configured to expose at least a part of the ear tip 213 to the outside. For example, the body 211 may allow the part of the ear tip 213, which is exposed to the outside, to be worn on (or inserted in) the user's body (e.g., an ear). In an embodiment, the body 211 may be configured to expose at least a part of the key button 215 to the outside. For example, the body 211 may allow the key button 215, which is exposed to the outside, to be contacted by a user.

TABLE 4

| User input operation | Time | | | | | | Signal reception state |
|---|---|---|---|---|---|---|---|
| | 100 ms | 200 ms | 300 ms | 400 ms | 500 ms | 600 ms | |
| Tap | √ Tap occurred | (first interval) | | | | | First signal |
| Touch | | | | | √ Touch occurred | | Third signal |

Referring to [Table 4], the sensor hub 150 according to an embodiment may receive the first signal from the sensor circuit 140 at a first time point (e.g., 100 ms) after the electronic device 100 is worn on (or inserted in) the user's body (e.g., an ear). For example, the sensor circuit 140 may detect one user input (e.g., a tap), and transmit the first signal to the sensor hub 150.

According to an embodiment, when the second signal is not transmitted from the touch IC 130 within a designated second interval (e.g., 200-300 ms) after the first signal is received at the first time point (e.g., 100 ms), the sensor hub 150 may transmit the first signal received at the first time point (e.g., 100 ms) to the processor 160 at a second time point (e.g., 400 ms). For example, the sensor hub 150 may store the first signal received at the first time point (e.g., 100 ms) such that the first signal is maintained at a valid state in the designated second interval (e.g., 200-300 ms).

According to an embodiment, the sensor hub 150 may receive a second signal from the touch IC 130 at a third time point (e.g., 500 ms). In an embodiment, when the third signal is received from the touch IC 130 corresponding to In an embodiment, the body 211 may allow the sensor 217 to be disposed inside (or outside) the body. For example, the body 211 may allow a user input (e.g., a tap) to be transferred to the sensor 217.

According to an embodiment, if the first electronic device 210 is worn on (or inserted in) the user's body (e.g., an ear), the ear tip 213 (or an ear cap) may come in close contact with a part (e.g., the auricle of an ear) of the user's body. In an embodiment, the ear tip 213 may be made of an elastic material. In an embodiment, the ear tip 213 may have a shape (e.g., a cylindrical shape) corresponding to a part (e.g., the auricle of an ear) of the user's body. In an embodiment, the ear tip 213 may be coupled to (e.g., integrated or removably attached) the body 211 of the first electronic device 210.

According to an embodiment, at least one key button 215 (e.g., the touch panel 120 in FIG. 1) may generate a signal for controlling operations of the first electronic device 210. For example, at least one key button 215 may generate signals for controlling operations such as power on, power off, volume control, data reproduction, data-pausing, and data reproduction speed control. In an embodiment, at least one key button 215 may be a touch screen panel. In an embodiment, when the key button 215 is configured by a touch screen panel, a touch area may be formed. For example, the key button 215 may detect contact of another part (e.g., a finger) of the user's body through the touch area.

According to an embodiment, at least one key button 215 may be configured to be locked. In an embodiment, when the at least one key button 215 is locked, the key button may not generate signals for controlling operations of the first electronic device 210. In an embodiment, when the at least one key button 215 is locked, a signal (e.g., the first signal) of the sensor 217 (e.g., an acceleration sensor) may be generated through the key button 215. In an embodiment, when the at least one key button 215 is locked, the first interval described with reference to FIG. 1 may not be allowed to be configured. Therefore, the sensing range of a user input (e.g., a tap) for generating the first signal by the sensor 217 may be extended.

According to an embodiment, at least one sensor 217 (e.g., the sensor circuit 140 in FIG. 1) may include at least one of an acceleration sensor, a gyro sensor, a geomagnetic sensor, a heart rate sensor, a proximity sensor, an optical sensor, a galvanic skin response (GSR) sensor, an electrocardiogram sensor, an electromyogram sensor, a blood glucose sensor, a blood pressure sensor, a pressure sensor, and a temperature sensor. In an embodiment, at least one sensor 217 may be disposed to be close to the user's body when the first electronic device 210 is worn on (or inserted in) the part (e.g., the auricle of an ear) of the user's body.

In an embodiment, the second electronic device 220 may be a counterpart electronic device corresponding to the first electronic device 210. In an embodiment, the second electronic device 220 may include at least one of a body 212, an ear tip 214, a key button 216, and a sensor 218. In an embodiment, at least one of the body 212, the ear tip 214, the key button 216, and the sensor 218 of the second electronic device 220 may correspond to at least one of the body 211, the ear tip 213, the key button 215, and the sensor 217 of the first electronic device 210.

Figure 3:
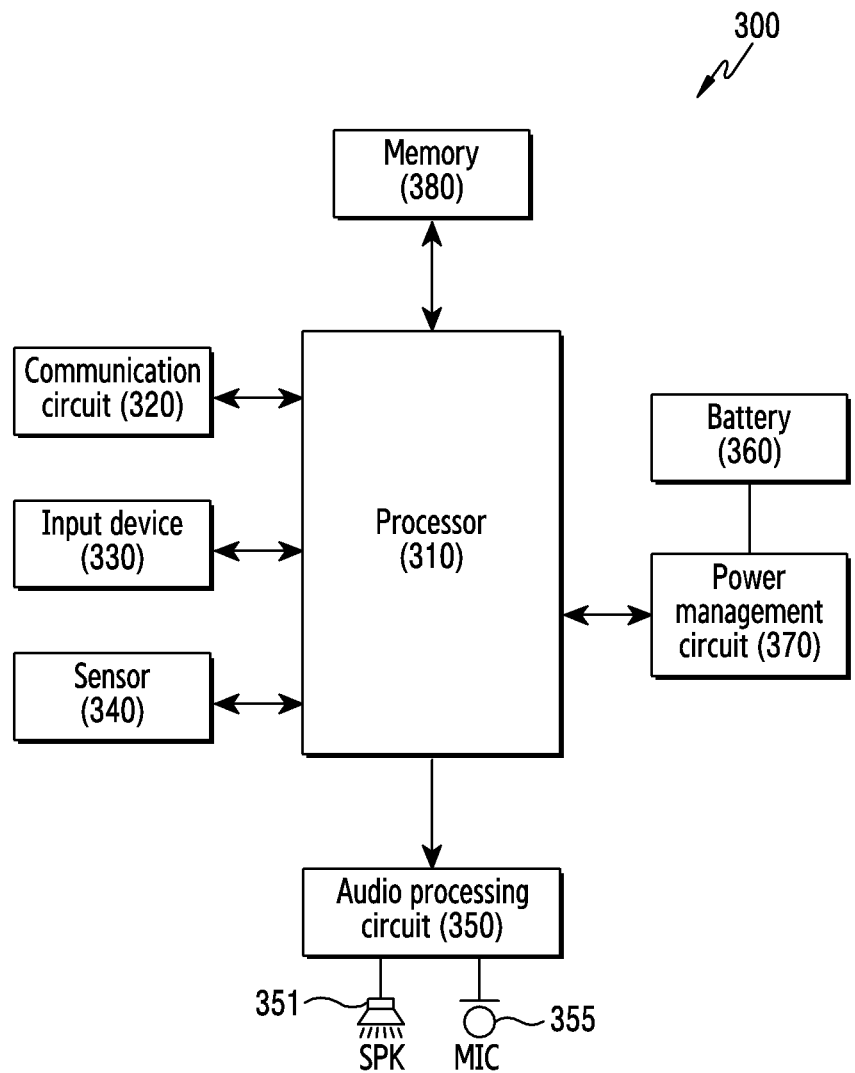
FIG. 3 illustrates elements of an electronic device according to an embodiment.

FIG. 3 illustrates elements of an electronic device according to an embodiment.

Referring to FIG. 3, an electronic device (e.g., the electronic device 100 in FIG. 1) may include at least one of a processor 310, a communication circuit 320, an input device 330, a sensor 340, an audio processing circuit 350, a speaker 351, a microphone 355, a battery 360, a power management circuit 370, and a memory 380.

According to an embodiment, the processor 310 (e.g., the processor 160 in FIG. 1) may control various functional operations (e.g., power on, power off, volume control, data reproduction, data-pausing, and data reproduction speed control) of the electronic device 300 (e.g., the electronic device 100 in FIG. 1). In an embodiment, if a third signal (e.g., corresponding to a touch) is received from the input device 330 (e.g., the touch panel 120 and the touch IC 130 in FIG. 1), the processor 310 may execute at least one (e.g., data reproduction) of the functional operations corresponding to the third signal. In an embodiment, if a first signal (e.g., corresponding to a tap) is received from the sensor 340 (e.g., the sensor circuit 140 in FIG. 1), the processor 310 may execute at least one (e.g., volume control) of the functional operations corresponding to the first signal. In an embodiment, the processor 310 may receive data from at least one of the communication circuit 320, the input device 330, the sensor 340, the audio processing circuit 350, the speaker 351, the microphone 355, the battery 360, the power management circuit 370, and the memory 380. For example, the processor 310 may process (e.g., calculate) received data. The processor 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 310 (e.g., the processor 160 in FIG. 1) may control the communication circuit 320 such that the electronic device 300 (e.g., the electronic device 100 in FIG. 1) is connected (e.g., Bluetooth-paired) to an external electronic device (e.g., a mobile terminal) through wireless communication. In an embodiment, when wireless communication between the electronic device 100 and the external electronic device (e.g., a mobile terminal) is established (e.g., Bluetooth-paired), the processor 310 may enable bidirectional communication between the electronic device 100 and the external electronic device (e.g., a mobile terminal). In an embodiment, the processor 310 may transmit, to the external electronic device (e.g., a mobile terminal), a signal (e.g., acknowledgement (ack) or negative acknowledgement (nack)) indicating whether data has been received from the external electronic device (e.g., a mobile terminal) through the communication circuit 320.

According to an embodiment, when wireless communication between the electronic device 300 (e.g., the electronic device 100 in FIG. 1) and an external electronic device (e.g., a mobile terminal) is established (e.g., Bluetooth-paired), the processor 310 (e.g., the processor 160 in FIG. 1) may receive data (e.g., data including an audio signal) from the external electronic device (e.g., a mobile terminal) by using the communication circuit 320.

According to an embodiment, the processor 310 (e.g., the processor 160 in FIG. 1) may transmit data received from an external electronic device (e.g., a mobile terminal) to the audio processing circuit 350. In an embodiment, the audio processing circuit 350 may convert (e.g., decode) data received from an external electronic device (e.g., a mobile terminal) into an audio signal. In addition, the audio processing circuit 350 may output a converted audio signal through the speaker 351.

According to an embodiment, when wireless communication between the electronic device 300 (e.g., the electronic device 100) and an external electronic device (e.g., a mobile terminal) is established (e.g., Bluetooth-paired), the processor 310 (e.g., the processor 160 in FIG. 1) may obtain (or identify) a wireless communication parameter related to the wireless communication connection. In an embodiment, the processor 310 may store, in the memory 380, a communication parameter obtained (or identified) from an external electronic device (e.g., a mobile terminal). In an embodiment, when separate wireless communication is established, the processor 310 may transmit a communication parameter to the counterpart electronic device (e.g., the second electronic device 220 in FIG. 2).

According to an embodiment, the processor 310 (e.g., the processor 160 in FIG. 1) may output data received from an external electronic device (e.g., a mobile terminal), through the microphone 355. In an embodiment, the processor 310 may convert (e.g., decode) data obtained using the audio processing circuit 350, into an audio signal. In an embodiment, the processor 310 may output a converted audio signal through the microphone 355.

According to an embodiment, the communication circuit 320 may establish a wireless communication connection (e.g., Bluetooth pairing) between the electronic device 300 (e.g., the electronic device 100 in FIG. 1) and an external electronic device (e.g., a mobile terminal). In an embodiment, the communication circuit 320 may receive data from the external electronic device (e.g., a mobile terminal) through the established wireless communication connection (e.g., Bluetooth pairing). In an embodiment, the communication circuit 320 may transmit data to the external electronic device (e.g., a mobile terminal) through the established wireless communication connection (e.g., Bluetooth pairing).

According to an embodiment, the input device 330 (e.g., the touch panel 120 and the touch IC 130 in FIG. 1) may receive an input from a user. In an embodiment, the input device 330 may control the volume of an audio signal output through the electronic device 300 (e.g., the electronic device 100 in FIG. 1), or may receive a user input for reproducing the next song.

According to an embodiment, the input device 330 (e.g., the touch panel 120 and the touch IC 130 in FIG. 1) may include a touch panel. In an embodiment, the input device 330 may detect a touch input or a hovering input through the touch panel. Touch inputs may further be distinguished between touches or taps, as explained above. In an embodiment, the input device 330 may include at least one physical key.

According to an embodiment, the input device 330 (e.g., the touch panel 120 and the touch IC 130 in FIG. 1) may transmit data (e.g., a second signal, a third signal, or a touch detection signal) indicating a user input (e.g., a touch) to the processor 310.

According to an embodiment, the audio processing circuit 350 may process a sound signal. In an embodiment, the audio processing circuit 350 may obtain a sound signal (e.g., a sound signal of a user) through the microphone 355. In an embodiment, the audio processing circuit 350 may convert a sound signal obtained through the microphone 355 into an analog audio signal (or an electrical signal) corresponding to the sound signal. In an embodiment, the audio processing circuit 350 may encode an analog audio signal to be a digital audio signal by using a codec. In an embodiment, the audio processing circuit 350 may transmit a digital audio signal to other elements (e.g., the processor 310, the communication circuit 320, and the memory 380) of the electronic device 300.

According to an embodiment, the audio processing circuit 350 may receive a digital audio signal from other elements (e.g., the processor 310, the communication circuit 320, the input device 330, and the memory 380) of the electronic device 300 (e.g., the electronic device 100 in FIG. 1). In an embodiment, the audio processing circuit 350 may decode a digital audio signal to be an analog audio signal by using a codec. In an embodiment, the audio processing circuit 350 may output a sound signal related to an analog audio signal through the speaker 351.

According to an embodiment, the battery 360 may supply power to at least one of the elements of the electronic device 300 (e.g., the electronic device 100 in FIG. 1). In an embodiment, the battery 360 may be charged when the electronic device 100 is mounted (or connected) to a designated charging device (e.g., a case).

According to an embodiment, the power management circuit 370 may manage power that is supplied to the electronic device 300 (e.g., the electronic device 100 in FIG. 1) through the battery 360. In an embodiment, the power management circuit 370 may measure the amount of power of the battery 360. In an embodiment, the power management circuit 370 may transmit information relating to the amount of power of the battery 360 to the processor 310. In an embodiment, the power management circuit 370 may be at least a part of a power management integrated circuit (PMIC).

Figure 4:
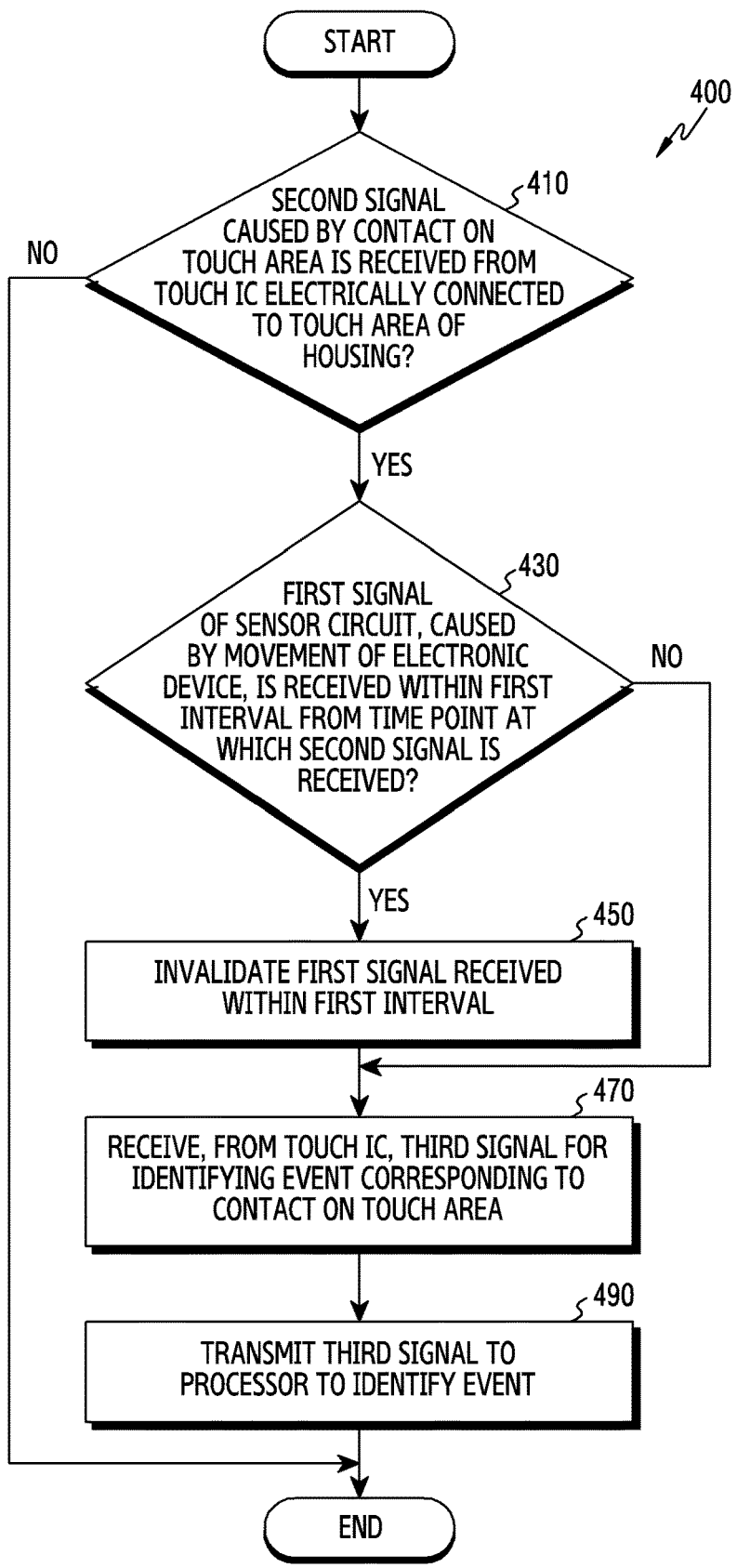
FIG. 4 illustrates a method for distinguishing between different input operations according to an embodiment.

FIG. 4 illustrates a method 400 for distinguishing between different input operations according to an embodiment. At least one of the elements of the electronic device described in FIG. 4 may be identical or similar to at least one of the elements of the electronic devices illustrated in FIG. 1 to FIG. 3, and a duplicate description is omitted.

Referring to FIG. 4, an electronic device (e.g., the electronic device 100 in FIG. 1) according to an embodiment may distinguish between different input operations (e.g., a touch and a tap) to execute a functional operation (e.g., data reproduction or volume control) intended by a user. For example, when one user input (e.g., a touch) is received through the touch panel 120, and another user input (e.g., a tap) is also received from the sensor circuit 140, the electronic device 100 may transmit only a signal caused by any one user input (e.g., a touch) to the processor 160 while ignoring the other user input.

Referring to operation 410, the electronic device (e.g., the electronic device 100 in FIG. 1) according to an embodiment may determine whether one user input (e.g., a touch) is received. In an embodiment, the sensor hub 150 may determine whether a second signal (e.g., a signal for notifying a contact on a touch area of the touch panel 120) is received from the touch IC 130. For example, when the reception of the second signal from the touch IC 130 is determined, the sensor hub 150 may perform operation 430. Conversely, when the second signal from the touch IC 130 is not received, the sensor hub 150 may terminate operation 410. For example, the sensor hub 150 may terminate operation 410 because the second signal has not been received from the touch IC 130, and may perform operation 410 again after the termination of operation 410.

Referring to operation 430, the electronic device (e.g., the electronic device 100 in FIG. 1) according to an embodiment may determine whether another user input (e.g., a tap) is received. In an embodiment, the sensor hub 150 may configure a designated first interval from a time point at which the second signal is received. In an embodiment, the sensor hub 150 may determine whether a first signal (e.g., a signal indicating the detection of a movement of the electronic device 100) is received from the sensor circuit 140 within the designated first interval. For example, when the reception of the first signal from the sensor circuit 140 is determined, the sensor hub 150 may perform operation 450. Conversely, when the first signal from the sensor circuit 140 is not received, the sensor hub 150 may perform operation 470. When the first signal is not received, since only one user input (e.g., a touch) has occurred without another user input (e.g., a tap), the sensor hub 150 may perform operation 470 according to the one user input (e.g., a touch).

Referring to operation 450, when one user input (e.g., a touch) has occurred together with another user input (e.g., a tap), the electronic device (e.g., the electronic device 100 in FIG. 1) according to an embodiment may ignore the other user input (e.g., a tap). In an embodiment, the sensor hub 150 may invalidate the first signal received from the sensor circuit 140 in the designated first interval. For example, the sensor hub 150 may ignore the first signal received from the sensor circuit 140 in the designated first interval so that the sensor hub does not transmit the first signal to the processor 160.

Referring to operation 470, the electronic device (e.g., the electronic device 100 in FIG. 1) according to an embodiment may receive a signal caused by the release of the one user input (e.g., a touch), meaning that the signal corresponds to the one user input (e.g., a touch). In an embodiment, the sensor hub 150 may receive a third signal (e.g., a signal indicating the detection of the release of a touch from a touch area of the touch panel 120) from the touch IC 130 after the reception of the second signal.

Referring to operation 490, the electronic device (e.g., the electronic device 100 in FIG. 1) according to an embodiment may allow the processor 160 to execute a functional operation (e.g., data reproduction) according to the third signal. In an embodiment, the sensor hub 150 may transmit the third signal received from the touch IC 130 to the processor 160. For example, the processor 160 may execute a functional operation (e.g., data reproduction) according to the third signal.

Figure 5:
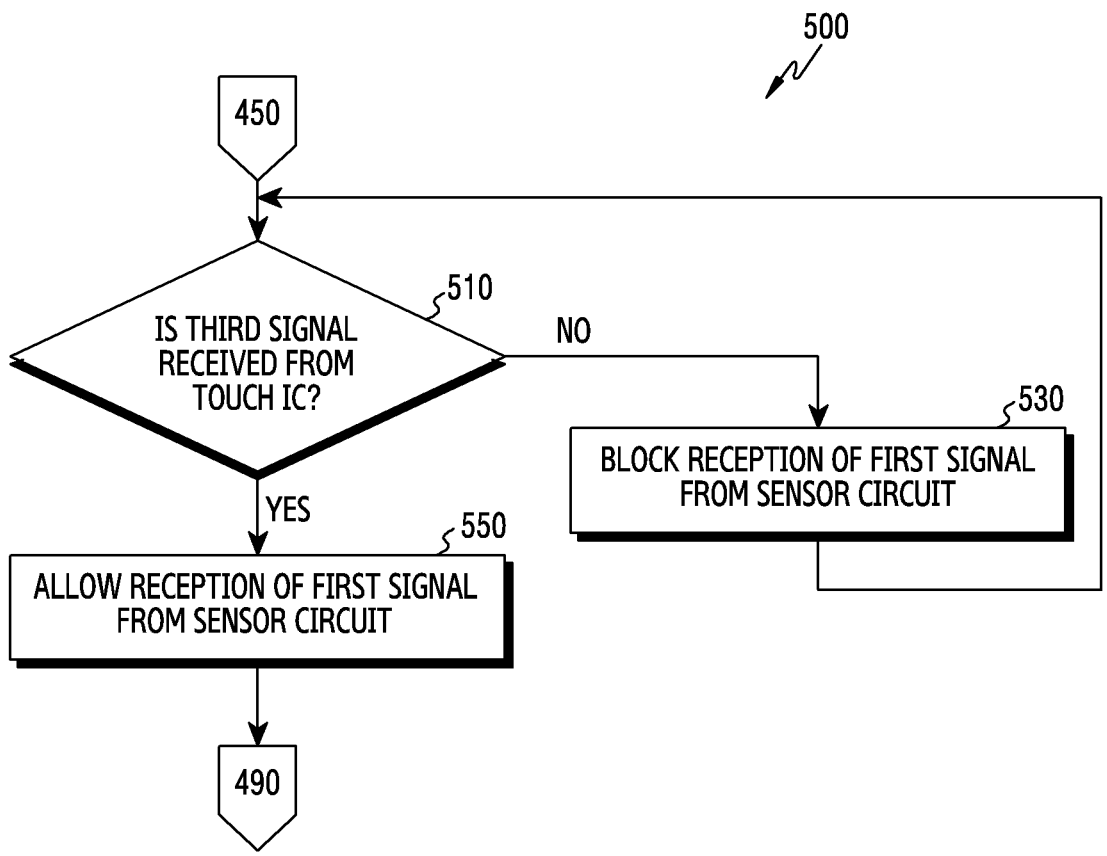
FIG. 5 illustrates a method for restricting the reception of at least one input operation according to an embodiment.

FIG. 5 illustrates a method for restricting the reception of at least one input operation according to an embodiment. The operations (operations 510 to 550) shown in FIG. 5 may be included in operation 470 shown in FIG. 4. At least one of the elements of the electronic device described in FIG. 5 may be identical or similar to at least one of the elements of the electronic devices illustrated in FIG. 1 to FIG. 3, and a duplicate description is omitted.

Referring to FIG. 5, an electronic device (e.g., the electronic device 100 in FIG. 1) according to an embodiment may receive the second signal according to one user input (e.g., a touch). Thereafter, while the electronic device is waiting for the release of the one user input (e.g., a touch), the electronic device may prevent interference from another user input (e.g., a tap).

Referring to operation 510, the electronic device (e.g., the electronic device 100 in FIG. 1) according to an embodiment may perform operation 510 after operation 450 of FIG. 4. In an embodiment, the sensor hub 150 may determine whether the third signal is received from the touch IC 130. For example, when the third signal from the touch IC 130 is received, the sensor hub 150 may perform operation 550. Conversely, when the third signal from the touch IC 130 is not received, the sensor hub 150 may perform operation 530. For example, the sensor hub 150 may perform operation 530 because the third signal has not been received from the touch IC 130.

Referring to operation 530, when another user input (e.g., a tap) has occurred from the sensor circuit 140, the electronic device (e.g., the electronic device 100 in FIG. 1) according to an embodiment may ignore the other user input (e.g., a tap). In an embodiment, when the first signal is transmitted from the sensor circuit 140, the sensor hub 150 may block the reception of the first signal. In an embodiment, after operation 530, the sensor hub 150 may perform operation 510 again to release the blocked reception of the first signal according to whether the third signal is received from the touch IC 130.

Referring to operation 550, when another user input (e.g., a tap) has occurred from the sensor circuit 140, the electronic device (e.g., the electronic device 100 in FIG. 1) according to an embodiment may allow the sensor hub 150 to convert into a state in which the reception of the first signal is possible. In an embodiment, the sensor hub 150 may allow the reception of the first signal from the sensor circuit 140. In an embodiment, when the second signal is received from the touch IC 130, the sensor hub 150 may maintain a state of blocking the reception of the first signal until further receiving the third signal from the touch IC 130. In addition, when the third signal is further received after the reception of the second signal, the sensor hub 150 may convert a blocked state into an allowed state with respect to the reception of the first signal. In an embodiment, the sensor hub 150 may perform operation 490 shown in FIG. 4 after operation 550. In an embodiment, the sensor hub 150 may also perform operation 550 after operation 490 shown in FIG. 4.

Figure 6:
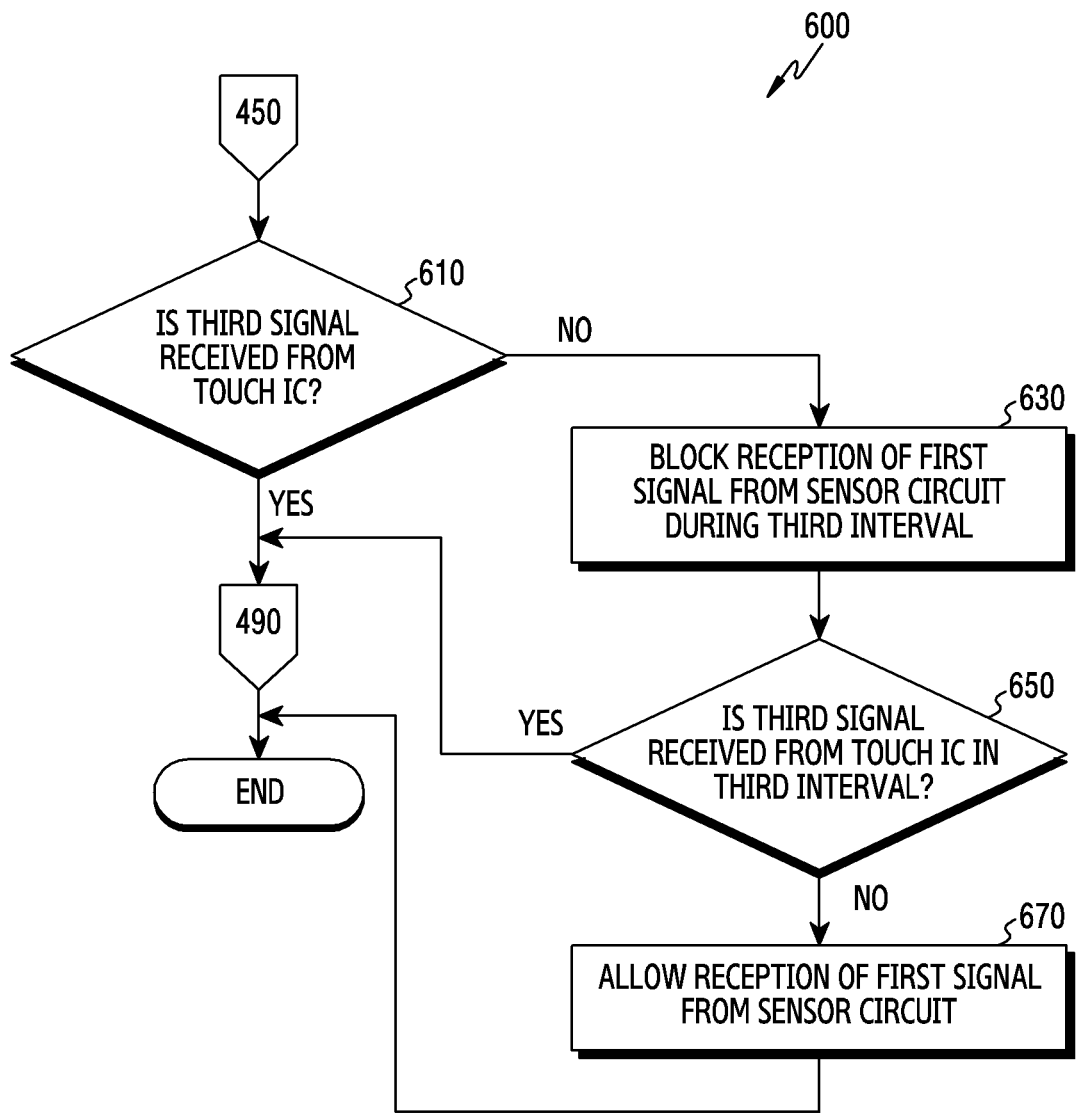
FIG. 6 illustrates a method for restricting the reception of at least one input operation according to an embodiment.

FIG. 6 illustrates a method for restricting the reception of at least one input operation according to an embodiment. The operations (operations 610 to 670) shown in FIG. 6 may be included in operation 470 shown in FIG. 4. At least one of the elements of the electronic device described in FIG. 6 may be identical or similar to at least one of the elements of the electronic devices illustrated in FIG. 1 to FIG. 3, and a duplicate description is omitted.

Referring to FIG. 6, an electronic device (e.g., the electronic device 100 in FIG. 1) according to an embodiment may receive the second signal according to one user input (e.g., a touch). Thereafter, while the electronic device is waiting for the release of the one user input (e.g., a touch), the electronic device may prevent interference from another user input (e.g., a tap).

Referring to operation 610, the electronic device (e.g., the electronic device 100 in FIG. 1) according to an embodiment may perform operation 610 after operation 450 shown in FIG. 4. In an embodiment, the sensor hub 150 may determine whether the third signal is received from the touch IC 130. For example, when the third signal from the touch IC 130 is received, the sensor hub 150 may perform operation 490 shown in FIG. 4. Conversely, when the third signal from the touch IC 130 is not received, the sensor hub 150 may perform operation 630. In one example, the sensor hub 150 may perform operation 630 because the third signal has not been received from the touch IC 130.

Referring to operation 630, when another user input (e.g., a tap) has occurred from the sensor circuit 140, the electronic device (e.g., the electronic device 100 in FIG. 1) according to an embodiment may neglect the other user input (e.g., a tap). In an embodiment, when the first signal is transmitted from the sensor circuit 140, the sensor hub 150 may block the reception of the first signal during a designated third interval. For example, until the designated third interval has passed, the sensor hub 150 may not receive the first signal from the sensor circuit 140.

Referring to operation 650, the electronic device (e.g., the electronic device 100 in FIG. 1) according to an embodiment may determine whether a touch on a touch area of the touch IC 130 is released. In an embodiment, the sensor hub 150 may determine whether the third signal is received from the touch IC 130 in the designated third interval. For example, when the third signal from the touch IC 130 is received in the designated third interval, the sensor hub 150 may perform operation 490 shown in FIG. 4. Conversely, when the third signal from the touch IC 130 is not received, the sensor hub 150 may perform operation 670. For example, the sensor hub 150 may perform operation 670 because the third signal has not been received from the touch IC 130.

Referring to operation 670, the electronic device (e.g., the electronic device 100 in FIG. 1) according to an embodiment may allow the sensor hub 150 to receive the first signal, according to the fact that a touch on a touch area of the touch IC 130 is not released. In an embodiment, when the designated third interval has passed without the reception of the third signal from the touch IC 130, the sensor hub 150 may allow the reception of the first signal from the sensor circuit 140. In another embodiment, until the third signal is received in the designated third interval from the touch IC 130, the sensor hub 150 may maintain a state of blocking the reception of the first signal.

Figure 7:
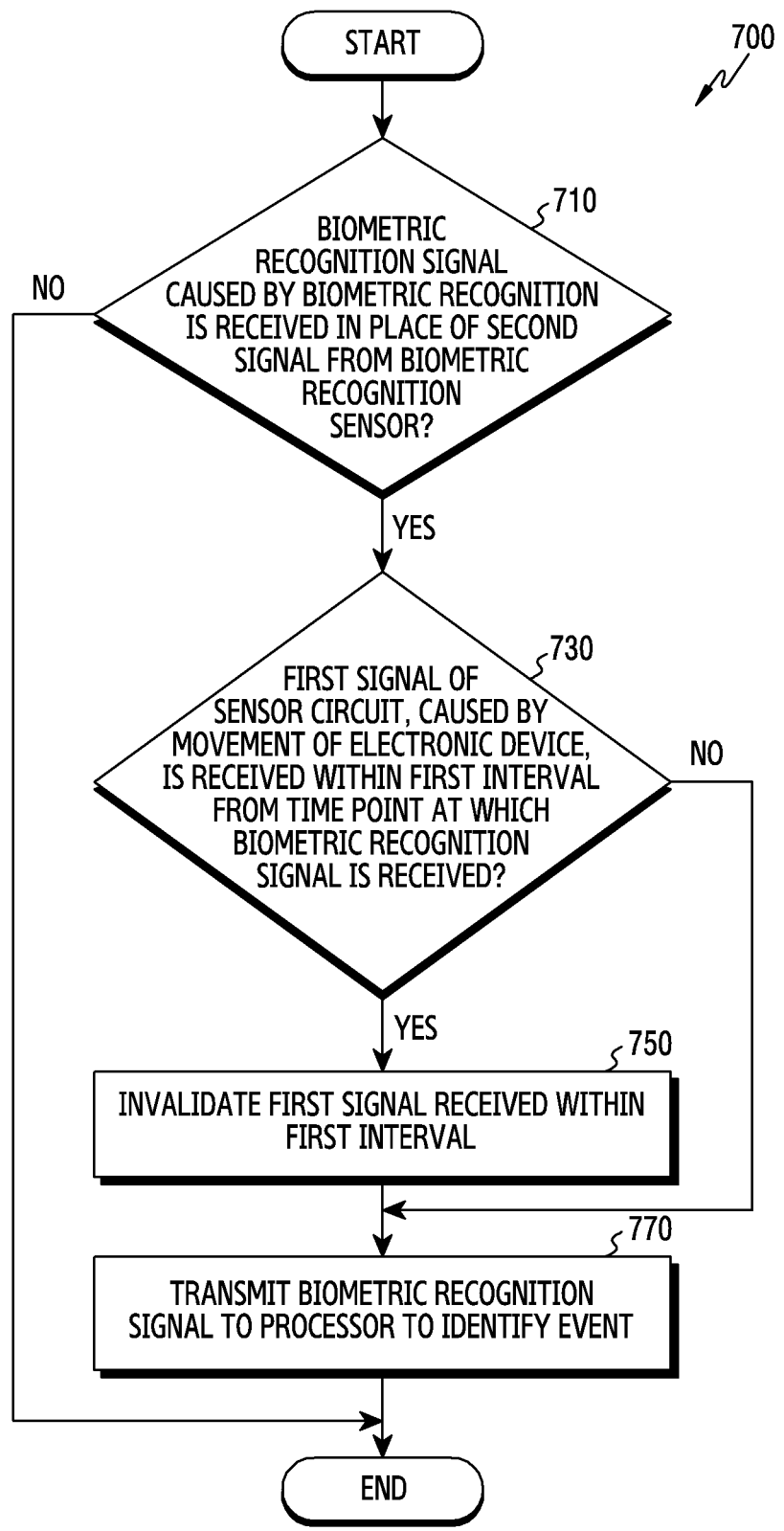
FIG. 7 illustrates a method for distinguishing between different input operations according to an embodiment.

FIG. 7 illustrates a method for distinguishing between different input operations according to an embodiment. At least one of the elements of the electronic device described in FIG. 7 may be identical or similar to at least one of the elements of the electronic devices illustrated in FIG. 1 to FIG. 3, and a duplicate description is omitted.

Referring to FIG. 7, an electronic device (e.g., the electronic device 100 in FIG. 1) according to an embodiment may distinguish between different input operations (e.g., biometric recognition and a tap) to execute a functional operation (e.g., data reproduction or volume control) intended by a user. For example, when one user input (e.g., biometric recognition) is received through the touch panel 120, and another user input (e.g., a tap) is also received from the sensor circuit 140, the electronic device 100 may transmit only a signal caused by only one particular user input (e.g., biometric recognition) to the processor 160.

Referring to operation 710, the electronic device (e.g., the electronic device 100 in FIG. 1) according to an embodiment may determine whether one user input (e.g., biometric recognition) is received. In an embodiment, the sensor hub 150 may determine whether a biometric recognition signal (e.g., a signal for the recognition of a user's fingerprint) is received from the touch IC 130. For example, when the biometric recognition signal from the touch IC 130 is received, the sensor hub 150 may perform operation 730. Conversely, when the biometric recognition signal from the touch IC 130 is not received, the sensor hub 150 may terminate operation 710. For example, the sensor hub 150 may terminate operation 710 because the biometric recognition signal has not been received from the touch IC 130, and may perform operation 710 again after the termination of operation 710. In an embodiment, the sensor hub 150 may also determine whether the biometric recognition signal is received from a biometric recognition sensor (e.g., a fingerprint recognition sensor, a PPG sensor, or an ECG sensor).

Referring to operation 730, the electronic device (e.g., the electronic device 100 in FIG. 1) according to an embodiment may determine whether another user input (e.g., a tap) is received. In an embodiment, the sensor hub 150 may configure a designated first interval from a time point at which the biometric recognition signal is received. In an embodiment, the sensor hub 150 may determine whether the first signal is received from the sensor circuit 140 in the designated first interval. For example, when the first signal from the sensor circuit 140 is received, the sensor hub 150 may perform operation 750. Conversely, when the first signal from the sensor circuit 140 is not received, the sensor hub 150 may perform operation 770. For example, since only one user input (e.g., a touch) has occurred without another user input (e.g., a tap), the sensor hub 150 may perform operation 770 according to the one user input (e.g., biometric recognition).

Referring to operation 750, when one user input (e.g., biometric recognition) has occurred together with another user input (e.g., a tap), the electronic device (e.g., the electronic device 100 in FIG. 1) according to an embodiment may ignore the other user input (e.g., a tap). In an embodiment, the sensor hub 150 may invalidate the first signal received from the sensor circuit 140 in the designated first interval. For example, the sensor hub 150 may ignore the first signal received from the sensor circuit 140 in the designated first interval so that the sensor hub does not transmit the first signal to the processor 160.

Referring to operation 770, the electronic device (e.g., the electronic device 100 in FIG. 1) according to an embodiment may allow the processor 160 to execute a functional operation (e.g., biometric recognition) according to the biometric recognition signal. In an embodiment, the sensor hub 150 may transmit the biometric recognition signal received from the touch IC 130 to the processor 160. For example, the processor 160 may execute a functional operation (e.g., biometric recognition) according to the biometric recognition signal.

Figure 8:
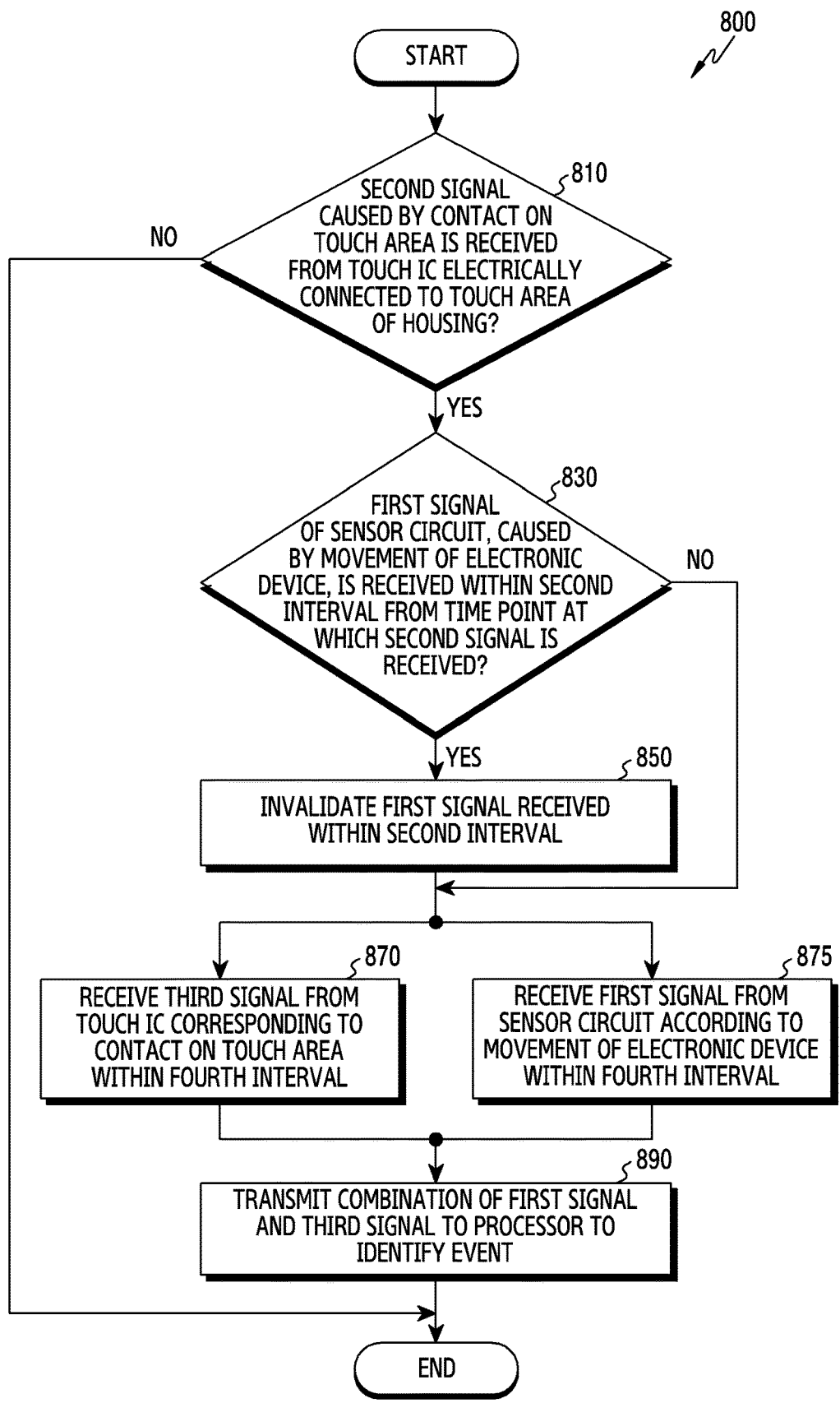
FIG. 8 illustrates a method for distinguishing between different input operations according to an embodiment.

FIG. 8 illustrates a method for distinguishing between different input operations according to an embodiment. At least one of the elements of the electronic device described in FIG. 8 may be identical or similar to at least one of the elements of the electronic devices illustrated in FIG. 1 to FIG. 3, and a duplicate description is omitted.

Referring to FIG. 8, an electronic device (e.g., the electronic device 100 in FIG. 1) according to an embodiment may distinguish between different input operations (e.g., a touch and a tap) to execute a functional operation (e.g., data reproduction or volume control) intended by the user. For example, when one user input (e.g., a touch) is received through the touch panel 120, and another user input (e.g., a tap) is also received from the sensor circuit 140, the electronic device 100 may ignore the other user input (e.g., a tap). In addition, the electronic device 100 may transmit a signal caused by the combination of the different input operations (e.g., a touch and a tap) to the processor 160.

Referring to operation 810, the electronic device (e.g., the electronic device 100 in FIG. 1) according to an embodiment may determine whether one user input (e.g., a touch) is received. In an embodiment, the sensor hub 150 may determine whether the second signal is received from the touch IC 130. For example, when the second signal from the touch IC 130 is received, the sensor hub 150 may perform operation 830. Conversely, when the second signal from the touch IC 130 is not received, the sensor hub 150 may terminate operation 810. For example, the sensor hub 150 may terminate operation 810 because the second signal has not been received from the touch IC 130, and may perform operation 810 again after the termination of operation 810.

Referring to operation 830, the electronic device (e.g., the electronic device 100 in FIG. 1) according to an embodiment may determine whether another user input (e.g., a tap) is received. In an embodiment, the sensor hub 150 may determine whether the first signal is received from the sensor circuit 140 in the designated second interval. For example, when the first signal from the sensor circuit 140 is received, the sensor hub 150 may perform operation 850. Conversely, when the first signal from the sensor circuit 140 is not received, the sensor hub 150 may perform at least one of operations 870 and 875. For example, since only one user input (e.g., a touch) without another user input (e.g., a tap) has occurred, the sensor hub 150 may perform at least one of operations 870 and 875 according to the one user input (e.g., a touch).

Referring to operation 850, when one user input (e.g., a touch) has occurred together with another user input (e.g., a tap), the electronic device (e.g., the electronic device 100 in FIG. 1) according to an embodiment may ignore the other user input (e.g., a tap). In an embodiment, the sensor hub 150 may invalidate the first signal received from the sensor circuit 140 in the designated second interval. For example, the sensor hub 150 may ignore the first signal received from the sensor circuit 140 in the designated second interval so that the sensor hub does not transmit the first signal to the processor 160.

Referring to operation 870, the electronic device (e.g., the electronic device 100 in FIG. 1) according to an embodiment may receive a signal caused by the release of the one user input (e.g., a touch), so that the signal corresponds to the one user input (e.g., a touch). In an embodiment, the sensor hub 150 may receive the third signal from the touch IC 130 in a designated fourth interval after the reception of the second signal. In an embodiment, the sensor hub 150 may configure the designated fourth interval as a time interval for receiving a combination (e.g., the third signal) with the first signal.

Referring to operation 875, the electronic device (e.g., the electronic device 100 in FIG. 1) according to an embodiment may receive another user input (e.g., a tap). In an embodiment, the sensor hub 150 may receive the first signal from the sensor circuit 140 in the designated fourth interval. For example, the sensor hub 150 may combine the first signal received in the designated fourth interval, with the third signal received in the designated fourth interval. For example, the sensor hub 150 may receive the first signal two times and the third signal one time in the designated fourth interval, and generate a new signal (e.g., a combination signal) in which the signals are combined with each other. As another example, the sensor hub 150 may receive the first signal two times and the third signal one time in the designated fourth interval, and transmit the combination thereof without change.

Referring to operation 890, the electronic device (e.g., the electronic device 100 in FIG. 1) according to an embodiment may cause the processor 160 to execute a functional operation (e.g., data reproduction) according to a combination of the first signal and the third signal. In an embodiment, the sensor hub 150 may transmit a combination of the first signal received from the sensor circuit 140 and the third signal received from the touch IC 130 to the processor 160. For example, the processor 160 may execute a functional operation (e.g., data reproduction) according to a combination of the first signal and the third signal.

According to an embodiment, the electronic device (e.g., the electronic device 100 in FIG. 1) may omit operations 810 to 850, and perform operations 870 to 890.

Figure 9A:
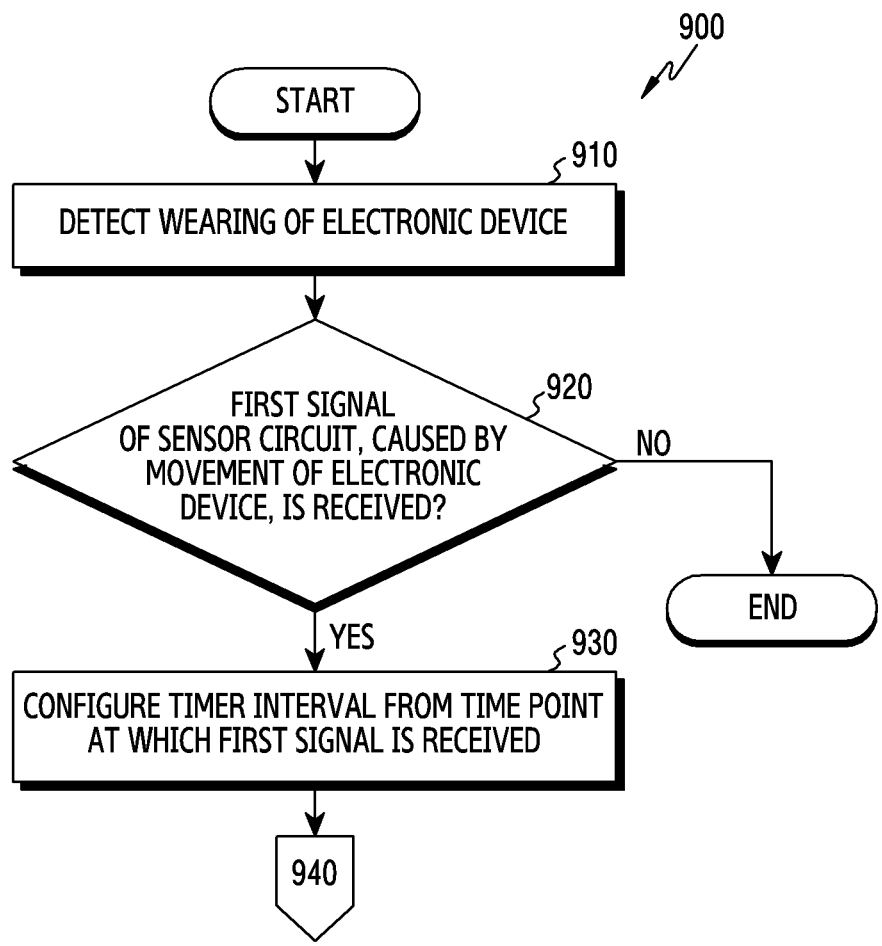
FIG. 9A illustrates a method for distinguishing between different input operations according to an embodiment.
Figure 9B:
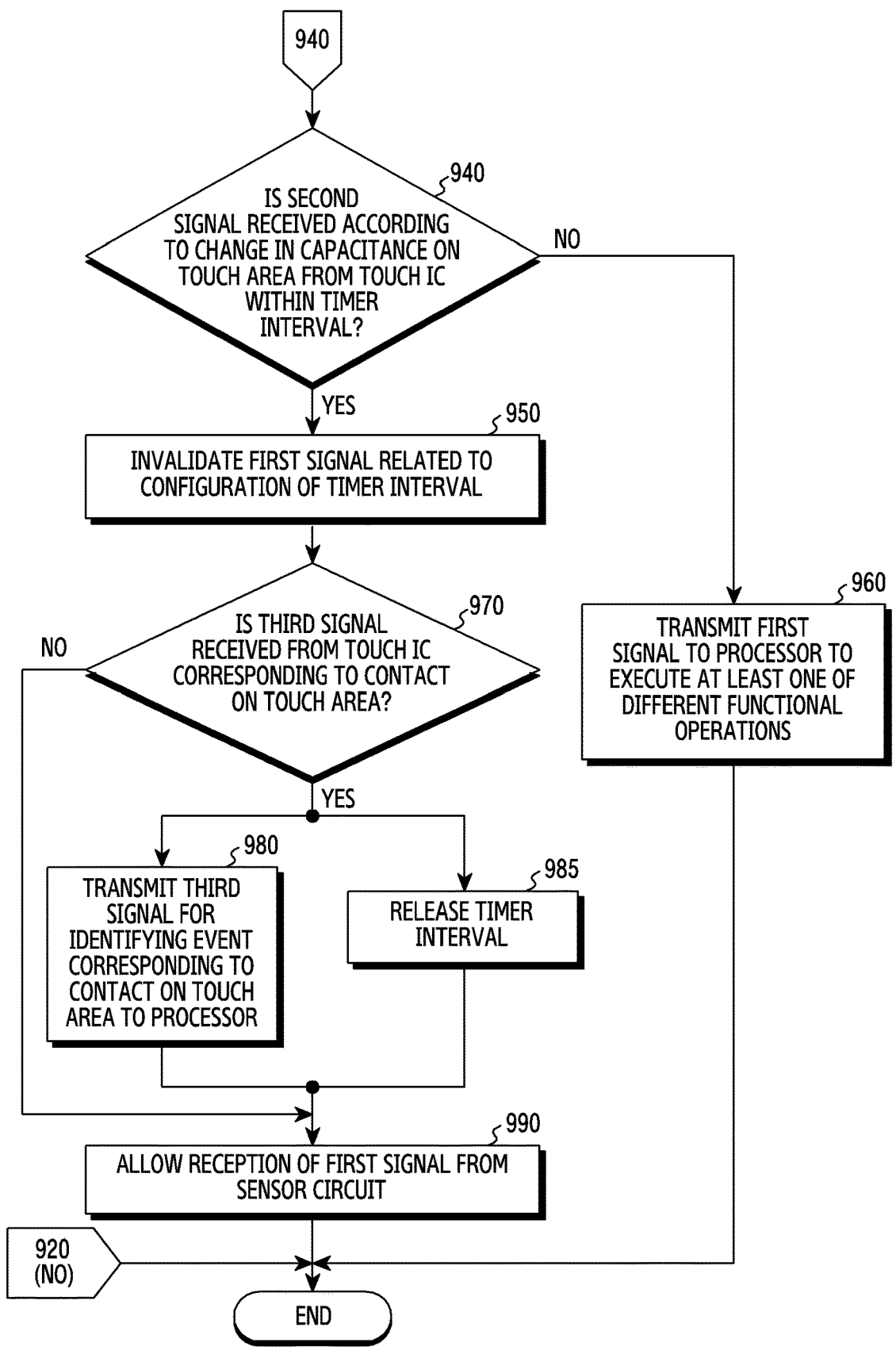
FIG. 9B illustrates a method for distinguishing between different input operations according to an embodiment.

FIG. 9A illustrates a method for distinguishing between different input operations according to an embodiment. FIG. 9B illustrates a method for distinguishing between input operations according to an embodiment. At least one of the elements of the electronic device described in FIGS. 9A and 9B may be identical or similar to at least one of the elements of the electronic devices illustrated in FIG. 1 to FIG. 3, and a duplicate description is omitted.

Referring to FIGS. 9A and 9B, an electronic device (e.g., the electronic device 100 in FIG. 1) according to an embodiment may distinguish between different input operations (e.g., a touch and a tap) to execute a functional operation (e.g., data reproduction or volume control) intended by a user. For example, when one user input (e.g., a touch) is received through the touch panel 120, and another user input (e.g., a tap) is also received from the sensor circuit 140, the electronic device 100 may transmit only a signal caused by only one particular user input (e.g., a touch) to the processor 160.

Referring to operation 910, the electronic device (e.g., the electronic device 100 in FIG. 1) according to an embodiment may detect that the electronic device has been worn on (or inserted in) the user's body (e.g., an ear). In an embodiment, the electronic device 100 may detect that the electronic device has been worn on (or inserted in) the user's body (e.g., an ear) or detect the user's body (e.g., an ear), by using at least one of a proximity sensor, an illuminance sensor, a sound sensor, and a biometric sensor. In an embodiment, a part (e.g., an ear tip) of the housing 110 of the electronic device 100 may be in close contact with a part (e.g., the auricle of an ear) of the user's body.

Referring to operation 920, the electronic device (e.g., the electronic device 100 in FIG. 1) according to an embodiment may determine whether one user input (e.g., a tap) is received. In an embodiment, the sensor hub 150 may determine whether the first signal is received from the sensor circuit 140. For example, when the first signal from the sensor circuit 140 is received, the sensor hub 150 may perform operation 930. Conversely, when the first signal from the sensor circuit 140 is not received, the sensor hub 150 may terminate operation 920. For example, the sensor hub 150 may terminate operation 920 because the first signal has not been received from the sensor circuit 140, and may perform operation 910 or operation 920 again after the termination of operation 920.

Referring to operation 930, the electronic device (e.g., the electronic device 100 in FIG. 1) according to an embodiment may cause the sensor hub 150 to configure a timer interval (e.g., a designated second interval). In an embodiment, the sensor hub 150 may configure the timer interval from a time point at which the first signal is received.

According to an embodiment, the timer interval may refer to a counter interval. For example, the timer interval may be implemented by a function of counting pulses input through an internal clock or an external pin, and when a particular time has passed or a particular number of pulses has occurred as the result of counting, thereby generating an interrupt or a signal.

Referring to operation 940, the electronic device (e.g., the electronic device 100 in FIG. 1) according to an embodiment may determine whether another user input (e.g., a touch) is received. In an embodiment, the sensor hub 150 may determine whether the second signal is received from the touch IC 130. For example, when the second signal from the touch IC 130 is received, the sensor hub 150 may perform operation 950. Conversely, when the second signal from the touch IC 130 is not received, the sensor hub 150 may perform operation 960.

Referring to operation 950, when one user input (e.g., a tap) has occurred together with another user input (e.g., a touch), the electronic device (e.g., the electronic device 100 in FIG. 1) according to an embodiment may ignore the one user input (e.g., a tap). In an embodiment, when the second signal is received from the touch IC 130 in the timer interval, the sensor hub 150 may invalidate the first signal which was used to configure the timer interval. For example, the sensor hub 150 may ignore the first signal which was used to configure the timer interval so that the sensor hub does not transmit the first signal to the processor 160.

Referring to operation 960, the electronic device (e.g., the electronic device 100 in FIG. 1) according to an embodiment may allow the processor 160 to execute a functional operation (e.g., volume control) according to the first signal. In an embodiment, the sensor hub 150 may transmit the first signal received from the sensor circuit 140 to the processor 160. For example, the sensor hub 150 may transmit the first signal to the processor 160 because the second signal has not been received from the touch IC 130 in the timer interval. In an embodiment, when the first signal is transmitted to the processor 160, the sensor hub 150 may release (e.g. end) the timer interval.

Referring to operation 970, the electronic device (e.g., the electronic device 100 in FIG. 1) according to an embodiment may receive a signal caused by the release of the other user input (e.g., a touch). In an embodiment, the sensor hub 150 may receive the third signal from the touch IC 130 after the reception of the second signal.

Referring to operation 980, the electronic device (e.g., the electronic device 100 in FIG. 1) according to an embodiment may allow the processor 160 to execute a functional operation (e.g., data reproduction) according to the third signal. In an embodiment, the sensor hub 150 may transmit the third signal received from the touch IC 130 to the processor 160. For example, the processor 160 may execute a functional operation (e.g., data reproduction) according to the third signal.

Referring to operation 985, the electronic device (e.g., the electronic device 100 in FIG. 1) according to an embodiment may cause the sensor hub 150 to release the timer interval. In an embodiment, the sensor hub 150 may release the timer interval in response to the reception of the third signal.

Referring to operation 990, the electronic device (e.g., the electronic device 100 in FIG. 1) according to an embodiment may allow the sensor hub 150 to convert into a state in which the reception of the first signal is possible, according to the release of the timer interval. In an embodiment, the sensor hub 150 may allow the reception of the first signal from the sensor circuit 140. In an embodiment, when the second signal is received from the touch IC 130, the sensor hub 150 may maintain a state of blocking the reception of the first signal until further receiving the third signal from the touch IC 130. In addition, when the third signal is further received after the reception of the second signal, the sensor hub 150 may convert a blocked state into an allowed state with respect to the reception of the first signal.

An electronic device (e.g., the electronic device 100 in FIG. 1) according to an embodiment may include: a housing (e.g., the housing 110 in FIG. 1) including a touch area; a touch integrated circuit (IC) (e.g., the touch IC 130 in FIG. 1) electrically connected to the touch area; a sensor circuit (e.g., the sensor circuit 140 in FIG. 1) configured to generate a first signal in response to detecting a movement of the electronic device 100; a sensor hub (e.g., the sensor hub 150 in FIG. 1) electrically connected to the touch IC 130 and the sensor circuit 140, and configured to receive the first signal from the sensor circuit 140; and a processor (e.g., the processor 160 in FIG. 1) configured to execute different functional operations according to a signal received from the sensor hub 150, wherein the touch IC 130 is configured to: when a contact on the touch area is detected, transmit a second signal to the sensor hub 150; and after transmitting the second signal to the sensor hub 150, transmit a third signal for identifying an event corresponding to the contact to the sensor hub 150, and wherein the sensor hub 150 is configured to: when the first signal is received within a first interval starting from a time point at which the second signal is received, invalidate the first signal; and when the third signal is received from the touch IC 130, transmit the third signal or a fourth signal based on the third signal to the processor 160.

According to an embodiment, the sensor hub 150 may be configured to: when the second signal is received within a second interval starting from a time point at which the first signal is received, invalidate the first signal; and when the second signal is not received within the second interval, transmit the first signal to the processor 160.

According to an embodiment, the sensor hub 150 may be configured to, after the first signal received within the first interval is invalidated, and until the third signal is received from the touch IC 130, block or invalidate reception of the first signal from the sensor circuit 140.

According to an embodiment, the sensor hub 150 may be configured to, after the first signal received within the first interval is invalidated, and when the third signal is received from the touch IC 130, allow reception of the first signal from the sensor circuit 140.

According to an embodiment, the sensor hub 150 may be configured to block or invalidate reception of the first signal from the sensor circuit 140 during a third interval starting from a time point at which the first signal received within the first interval is invalidated.

According to an embodiment, the sensor hub 150 may be configured to, when a third interval starting from a time point at which the first signal received within the first interval is invalidated has elapsed, allow reception of the first signal from the sensor circuit 140.

According to an embodiment, the touch IC 130 may be configured to generate the second signal to indicate that the contact has occurred before the processor 160 identifies the event.

According to an embodiment, the touch IC 130 may be configured to: when a capacitance change of a designated first change amount or higher is detected in the touch area due to the contact, generate the second signal; and when a capacitance change of a designated second change amount or higher is detected in the touch area due to the contact, generate the third signal, and wherein the first change amount may be smaller than the second change amount.

According to an embodiment, the electronic device may further include a biometric recognition sensor, and the biometric recognition sensor may be configured to, when a biometric signal is recognized, transmit a biometric recognition signal caused by the biometric signal, to the sensor hub 150 in place of the second signal.

According to an embodiment, the sensor hub 150 may be configured to transmit, to the processor 160, a combination of the first signal received from the sensor circuit 140 and the third signal received from the touch IC, when the first signal and the third signal are received within a fourth interval starting from a time point at which the first signal received within the first interval is invalidated.

A method (e.g., the method 400 in FIG. 4) for distinguishing between different input operations of an electronic device (e.g., the electronic device 100 in FIG. 1) based on a first signal and a second signal according to an embodiment may include: receiving the second signal according to a contact on a touch area of a housing 110 of the electronic device 100 from a touch IC 130 electrically connected to the touch area (e.g., operation 410 in FIG. 4); receiving the first signal from a sensor circuit 140 according to a movement of the electronic device 100 within a first interval starting from a time point at which the second signal is received (e.g., operation 430 in FIG. 4); invalidating the first signal received within the first interval (e.g., operation 450 in FIG. 4); receiving, from the touch IC 130, a third signal for identifying an event corresponding to the contact on the touch area (e.g., operation 470 in FIG. 4); and transmitting the third signal or a fourth signal based on the third signal to a processor 160 to identify the event (e.g., operation 490 in FIG. 4).

According to an embodiment, the method may further include: when the second signal is received within a second interval starting from a time point at which the first signal is received, invalidating the first signal; and when the second signal is not received within the second interval, transmitting the first signal to the processor 160.

According to an embodiment, the method may further include, after the first signal received within the first interval is invalidated, and until the third signal is received from the touch IC 130, blocking or invalidating reception of the first signal from the sensor circuit 140 (e.g., operation 530 in FIG. 5).

According to an embodiment, the method may further include, after the first signal received within the first interval is invalidated, and when the third signal is received from the touch IC 130, allowing reception of the first signal from the sensor circuit 140 (e.g., operation 550 in FIG. 5).

According to an embodiment, the method may further include blocking or invalidating reception of the first signal from the sensor circuit 140 during a third interval starting from a time point at which the first signal received within the first interval is invalidated (e.g., operation 630 in FIG. 6).

According to an embodiment, the method may further include, when a second interval starting from a time point at which the first signal received within the first interval is invalidated has elapsed, allowing reception of the first signal from the sensor circuit 140.

According to an embodiment, the receiving of the second signal may include receiving, from the touch IC 130, the second signal to indicate that the contact has occurred before the processor 160 identifies the event.

According to an embodiment, the receiving of the second signal may include: when a capacitance change of a designated first change amount or higher is detected in the touch area due to the contact, receiving the second signal from the touch IC 130; and when a capacitance change of a designated second change amount or higher is detected in the touch area due to the contact, receiving the third signal from the touch IC 130.

According to an embodiment, the method may further include receiving a biometric recognition signal caused by recognition of a biometric signal from a biometric recognition sensor in place of the second signal (e.g., operation 710 in FIG. 7).

According to an embodiment, the method may further include transmitting, to the processor 160, a combination of the first signal received from the sensor circuit 140 and the third signal received from the touch IC 130, when the first signal and the third signal are received within a fourth interval starting from a time point at which the first signal received within the first interval is invalidated (e.g., operation 890 in FIG. 8).

Figure 10:
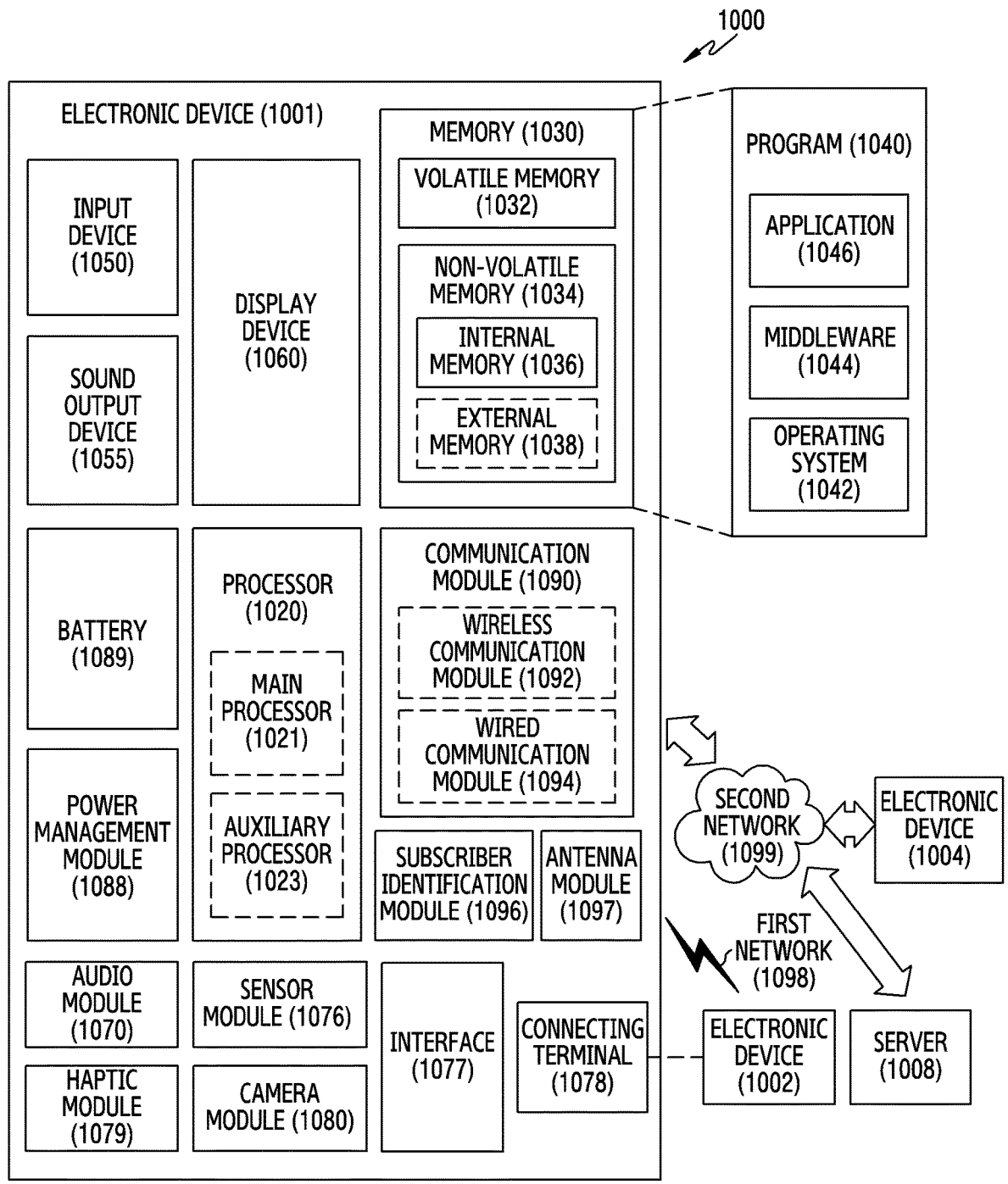
FIG. 10 illustrates an electronic device in a network environment according to an embodiment.

FIG. 10 illustrates an electronic device 1001 device in a network environment 1000 according to an embodiment. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 104 may be a device of a same type as, or a different type, from the electronic device 1001. According to an embodiment, all or some of operations to be executed at the electronic device 1001 may be executed at one or more of the external electronic devices 1002, 1004, or 108. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

According to certain embodiments disclosed herein, various input operations (e.g., a touch and a tap) are distinguished according to one or more conditions, so that an unintended functional operation can be prevented from being wrongly executed.

Moreover, according to certain embodiments disclosed herein, there may be various input operations but only a functional operation intended by the user in a limited state (e.g., a state in which the user is unable to look at the electronic device) can be executed.

Various other effects directly or indirectly recognized through the specification can also be provided.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a housing including a touch area;
    a touch integrated circuit (IC) electrically connected to the touch area;
    a sensor circuit configured to generate a first signal in response to detecting a movement of the electronic device;
    a sensor hub electrically connected to the touch IC and the sensor circuit, and configured to receive the first signal from the sensor circuit; and
    a processor configured to execute different functional operations according to a signal received from the sensor hub,
    wherein the touch IC is configured to:
        when a contact on the touch area is detected, transmit a second signal to the sensor hub; and
        after transmitting the second signal to the sensor hub, transmit a third signal for identifying an event corresponding to the contact to the sensor hub, and
    wherein the sensor hub is configured to:
        when the first signal is received within a first interval starting from a time point at which the second signal is received, invalidate the first signal; and
        when the third signal is received from the touch IC, transmit the third signal or a fourth signal based on the third signal to the processor.

2. The electronic device of claim 1, wherein the sensor hub is further configured to:
    when the second signal is received within a second interval starting from a time point at which the first signal is received, invalidate the first signal; and
    when the second signal is not received within the second interval, transmit the first signal to the processor.

3. The electronic device of claim 1, wherein the sensor hub is further configured to, after the first signal received within the first interval is invalidated, and until the third signal is received from the touch IC, block or invalidate reception of the first signal from the sensor circuit.

4. The electronic device of claim 1, wherein the sensor hub is further configured to, after the first signal received within the first interval is invalidated, and when the third signal is received from the touch IC, allow reception of the first signal from the sensor circuit.

5. The electronic device of claim 1, wherein the sensor hub is further configured to block or invalidate reception of the first signal from the sensor circuit during a third interval starting from a time point at which the first signal received within the first interval is invalidated.

6. The electronic device of claim 1, wherein the sensor hub is further configured to, when a third interval starting from a time point at which the first signal received within the first interval is invalidated has elapsed, allow reception of the first signal from the sensor circuit.

7. The electronic device of claim 1, wherein the touch IC is further configured to generate the second signal to indicate that the contact has occurred before the processor identifies the event.

8. The electronic device of claim 1, wherein the touch IC is further configured to:
    when a capacitance change of a designated first change amount or higher is detected in the touch area due to the contact, generate the second signal; and
    when a capacitance change of a designated second change amount or higher is detected in the touch area due to the contact, generate the third signal, and
    wherein the first change amount is smaller than the second change amount.

9. The electronic device of claim 1, further comprising a biometric recognition sensor,
    wherein the biometric recognition sensor is configured to, when a biometric signal is recognized, transmit a biometric recognition signal caused by the biometric signal, to the sensor hub in place of the second signal.

10. The electronic device of claim 1, wherein the sensor hub is further configured to transmit, to the processor, a combination of the first signal received from the sensor circuit and the third signal received from the touch IC, when the first signal and the third signal are received within a fourth interval starting from a time point at which the first signal received within the first interval is invalidated.

11. A method for distinguishing between different input operations of an electronic device based on a first signal and a second signal, the method comprising:
    receiving the second signal according to a contact on a touch area of a housing of the electronic device from a touch integrated circuit (IC) electrically connected to the touch area;
    receiving the first signal from a sensor circuit according to a movement of the electronic device within a first interval starting from a time point at which the second signal is received;
    invalidating the first signal received within the first interval;
    receiving, from the touch IC, a third signal for identifying an event corresponding to the contact on the touch area; and
    transmitting the third signal or a fourth signal based on the third signal to a processor to identify the event.

12. The method of claim 11, further comprising:
when the second signal is received within a second interval starting from a time point at which the first signal is received, invalidating the first signal; and
when the second signal is not received within the second interval, transmitting the first signal to the processor.

13. The method of claim 11, further comprising, after the first signal received within the first interval is invalidated, and until the third signal is received from the touch IC, blocking or invalidating reception of the first signal from the sensor circuit.

14. The method of claim 11, further comprising, after the first signal received within the first interval is invalidated, and when the third signal is received from the touch IC, allowing reception of the first signal from the sensor circuit.

15. The method of claim 11, further comprising blocking or invalidating reception of the first signal from the sensor circuit during a third interval starting from a time point at which the first signal received within the first interval is invalidated.

16. The method of claim 11, further comprising, when a second interval starting from a time point at which the first signal received within the first interval is invalidated has elapsed, allowing reception of the first signal from the sensor circuit.

17. The method of claim 11, wherein the receiving of the second signal comprises receiving, from the touch IC, the second signal to indicate that the contact has occurred before the processor identifies the event.

18. The method of claim 11, wherein the receiving of the second signal comprises:
when a capacitance change of a designated first change amount or higher is detected in the touch area due to the contact, receiving the second signal from the touch IC; and
when a capacitance change of a designated second change amount or higher is detected in the touch area due to the contact, receiving the third signal from the touch IC.

19. The method of claim 11, further comprising receiving a biometric recognition signal caused by recognition of a biometric signal from a biometric recognition sensor in place of the second signal.

20. The method of claim 11, further comprising transmitting, to the processor, a combination of the first signal received from the sensor circuit and the third signal received from the touch IC, when the first signal and the third signal are received within a fourth interval starting from a time point at which the first signal received within the first interval is invalidated.

* * * * *